US011084559B2

(12) United States Patent
Davis et al.

(10) Patent No.: US 11,084,559 B2
(45) Date of Patent: Aug. 10, 2021

(54) OUTBOARD MOTOR LIGHTING SYSTEM

(71) Applicant: AB Volvo Penta, Gothenburg (SE)

(72) Inventors: Eric A. Davis, Mequon, WI (US); Richard A. Davis, Mequon, WI (US)

(73) Assignee: AB Volvo Penta, Gothenburg (SE)

( * ) Notice: Subject to any disclaimer, the term of this patent is extended or adjusted under 35 U.S.C. 154(b) by 351 days.

(21) Appl. No.: 16/381,677

(22) Filed: Apr. 11, 2019

(65) Prior Publication Data

US 2019/0276122 A1 Sep. 12, 2019

Related U.S. Application Data

(62) Division of application No. 15/041,880, filed on Feb. 11, 2016, now Pat. No. 10,259,545.

(Continued)

(51) Int. Cl.
*B60Q 1/30* (2006.01)
*B63B 45/02* (2006.01)

(Continued)

(52) U.S. Cl.
CPC .............. *B63B 45/02* (2013.01); *B63B 45/04* (2013.01); *B63H 20/32* (2013.01); *F21S 43/237* (2018.01);

(Continued)

(58) Field of Classification Search
CPC ......... B63B 45/00; B63B 45/02; B63B 45/04; B63B 45/06; B63B 2201/08; B60Q 1/30
See application file for complete search history.

(56) References Cited

U.S. PATENT DOCUMENTS 5,613,886 A * 3/1997 Cribbs .................. B60Q 1/305 440/2
6,200,009 B1 * 3/2001 Schulte .................... B60Q 1/30 340/984

(Continued)

FOREIGN PATENT DOCUMENTS

DE 102012005351 9/2013

OTHER PUBLICATIONS

PCT/US2016/017586 International Search Report and Written Opinion of the International Searching Authority for dated May 31, 2016 (9 pages).

(Continued)

*Primary Examiner* — Andrew J Coughlin
(74) *Attorney, Agent, or Firm* — SmithAmundsen LLC

(57) ABSTRACT

The present invention relates generally to lighting systems employed in outboard motors used as marine propulsion systems, and to marine vessel assemblies employing outboard motors with such lighting systems, and related methods of operation and implementation. In one example embodiment of a lighting system, the lighting system includes a first cowling panel portion including a reflective strip portion, and a second cowling panel portion that, in combination with the first cowling panel portion, at least partly defines an interior region within the cowling. The lighting system also includes a lighting source that is positioned within the interior region and positioned so that, when operating, first light is emitted toward the reflective strip portion and, upon the first light reaching the reflective strip portion, at least some of the first light is directed outward away from the cowling.

9 Claims, 16 Drawing Sheets

Related U.S. Application Data

(60) Provisional application No. 62/114,987, filed on Feb. 11, 2015.

(51) Int. Cl.

| | |
|---|---|
| ***B63B 45/04*** | (2006.01) |
| ***B63H 20/32*** | (2006.01) |
| ***F21S 43/237*** | (2018.01) |
| ***F21S 43/30*** | (2018.01) |
| ***F21S 45/50*** | (2018.01) |
| ***F21V 23/00*** | (2015.01) |
| ***F21V 23/06*** | (2006.01) |
| *F21Y 115/10* | (2016.01) |

(52) U.S. Cl.

CPC ............... *F21S 43/30* (2018.01); *F21S 45/50* (2018.01); *F21V 23/001* (2013.01); *F21V 23/06* (2013.01); *F21Y 2115/10* (2016.08)

(56) References Cited

U.S. PATENT DOCUMENTS

| | | | | |
|---|---|---|---|---|
| 6,948,834 | B2 * | 9/2005 | Lilly ....................... | B63B 45/06 362/477 |
| D515,228 | S | 2/2006 | Gebhard et al. | |
| D528,230 | S | 9/2006 | Nagano | |
| D532,126 | S | 11/2006 | Kinzel et al. | |
| 7,163,428 | B2 * | 1/2007 | Sanschagrin .......... | B63H 20/32 123/195 C |
| D544,113 | S | 6/2007 | Ueda et al. | |
| D575,424 | S | 8/2008 | Gebhard et al. | |
| D582,084 | S | 12/2008 | Gebhard et al. | |
| D597,237 | S | 7/2009 | Kumthampinji et al. | |
| D652,161 | S | 1/2012 | Perkins | |
| D665,113 | S | 8/2012 | Perkins | |
| 10,259,545 | B2 | 4/2019 | Davis et al. | |
| 2003/0194927 | A1 | 10/2003 | Sanschagrin et al. | |
| 2004/0130905 | A1 | 7/2004 | Olds et al. | |
| 2006/0052014 | A1 | 3/2006 | Kobayashi | |
| 2007/0093151 | A1 | 4/2007 | Sanschagrin et al. | |

OTHER PUBLICATIONS

Johnson, “Supercars Can’t Swim, or Can They? Honda Shows off an Acura NSX-Inspired Outboard Motor”, Car and Driver Nog, Feb. 16, 2017, https://blog.caranddriver,com/supercars-cant-swim-or-can-they-hondashows-off-an-acura-nsx-inspired-outboard-motor/ (5 pages).
PCT/US2016/017586 International Preliminary Report on Patentability for Application No. PCT/US2016/017586 dated Aug. 24, 2017 (2 pages).
Communication pursuant to Rules 161(1) and 162 EPC for European Application No. 16709618.9 dated Nov. 29, 2017 (2 pages).
Response to Communication pursuant to Rules 161(1) and 162 EPC for European Application No. 16709618.9 dated Jun. 6, 2018 (1 page).
Communication pursuant to Article 94(3) EPC for European Application No. 16709618.9 dated Dec. 5, 2018 (5 pages).
Response to the Official Communication for European Application No. 16709618.9 dated Feb. 14, 2019 (14 pages).
EP167099189 European Examination Report pursuant to Article 94(3) EPC dated May 28, 2019 (3 pages).
First Office Action from the Australian Intellectual Property Office for Application No. 2016219194 dated Jul. 12, 2019 (2pages).
Response to the Official Communication for European Application No. 16709618.9 dated Oct. 2, 2019 (25 pages).

* cited by examiner

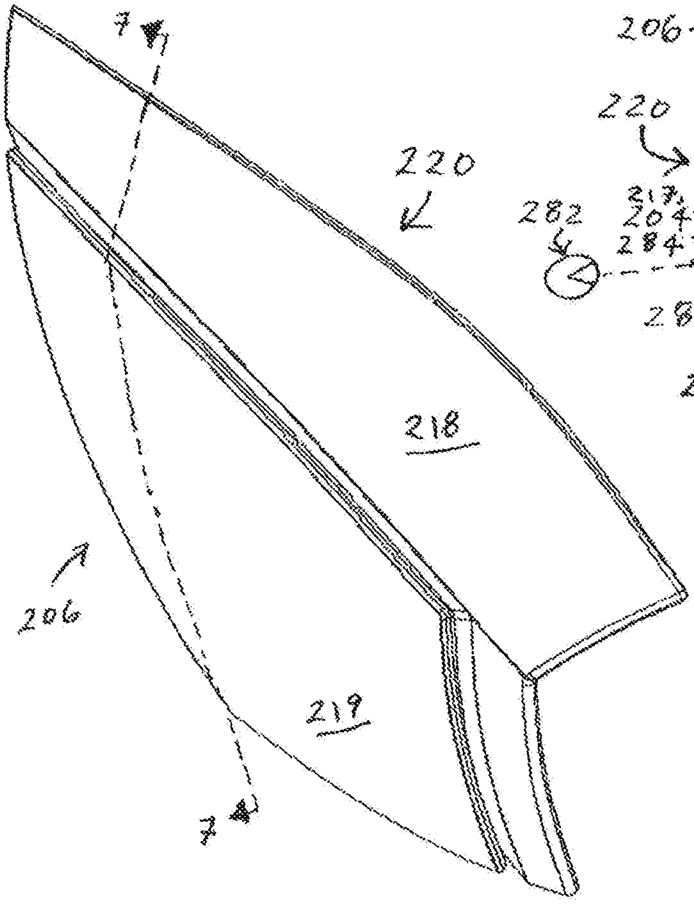
FIG. 6
FIG. 7
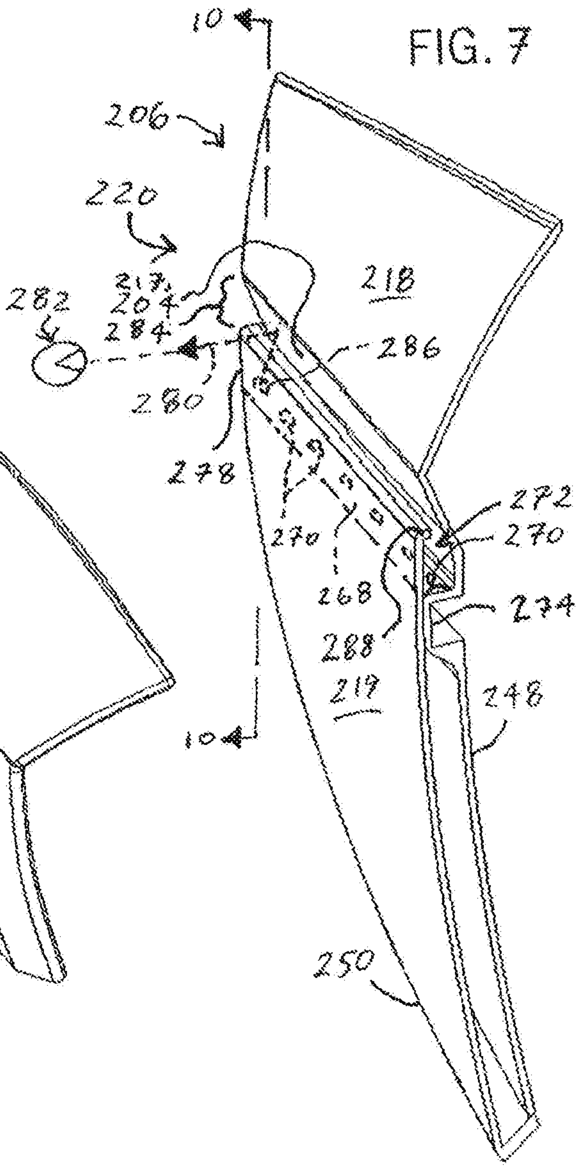

FIG. 16
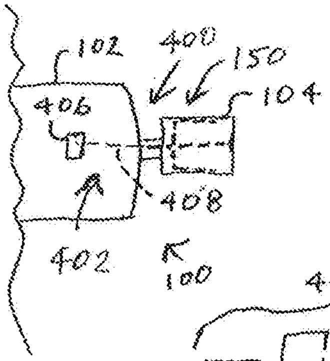
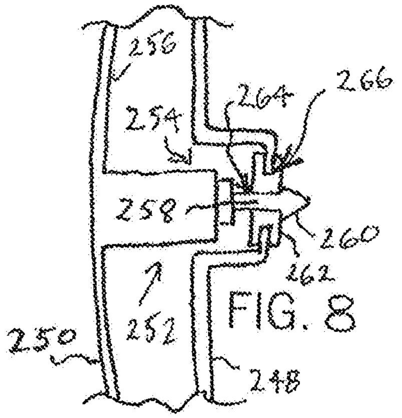
FIG. 8
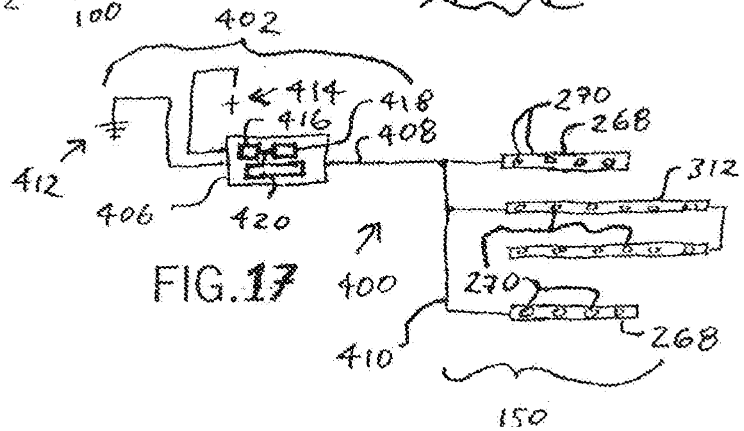
FIG. 17
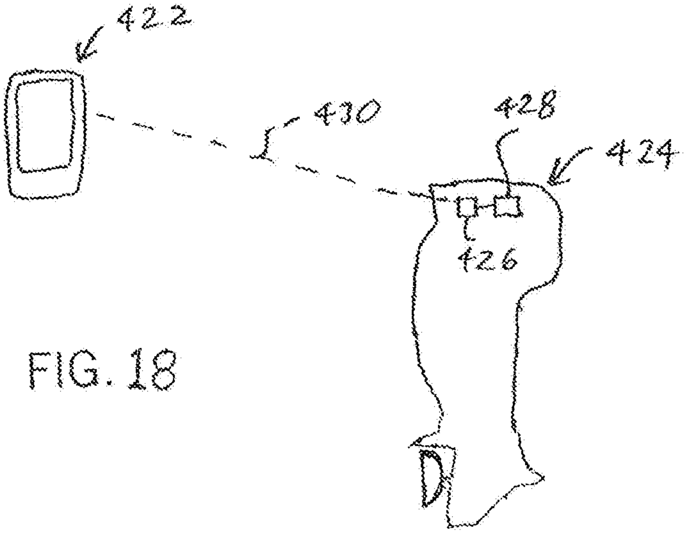
FIG. 18

OUTBOARD MOTOR LIGHTING SYSTEM

CROSS-REFERENCE TO RELATED APPLICATIONS

The present application is a divisional of U.S. application Ser. No. 15/041,880 filed on Feb. 11, 2016 and entitled "Outboard Motor Lighting System,", which claims the benefit of U.S. provisional patent application no. 62/114,987 filed on Feb. 11, 2015 and entitled "Outboard Motor Lighting System," the contents of each of the foregoing being hereby incorporated by reference in their entirety.

STATEMENT REGARDING FEDERALLY SPONSORED RESEARCH OR DEVELOPMENT

FIELD OF THE INVENTION

The present invention relates to outboard motors used as marine propulsion systems, and more particularly to lighting systems associated with such outboard motors, as well as related methods of operating and implementing such lighting systems.

BACKGROUND OF THE INVENTION

Lighting systems are of significance to many marine vessels. Marine vessels are often operated at night time in open waters or in other circumstances where there is little or no sunlight or light from other sources (ambient light), and therefore lighting systems on the marine vessels themselves are valuable both in terms of enabling third parties to see or detect the presence or movement of the marine vessels as well as in terms of enabling individuals on board the marine vessels to view the surrounding environment and the relative positioning of the marine vessels to that surrounding environment.

Many marine vessels employ outboard motors as sources of propulsion for the marine vessels. Such outboard motors are typically mounted on the marine vessels at locations at or near the sterns of the marine vessels and are mounted in a manner such that the outboard motors extend outward beyond the perimeters of the marine vessels on which the outboard motors are mounted. Given this positioning of the outboard motors, it additionally can be of importance that any lighting systems associated with the marine vessels enable individuals on board (or operating) the marine vessels, as well as third parties not on the marine vessels, to see or detect the presence or positioning of the outboard motors. This can be of particular value when operating the marine vessels relative to other objects (e.g., other marine vessels, piers, etc.).

For at least these reasons or other reasons, therefore, it would be advantageous if new or improved lighting systems for use in relation to marine vessels employing outboard motors, and/or new or improved methods for operating or implementing such lighting systems, could be developed.

BRIEF SUMMARY OF THE INVENTION

The present inventors have recognized the importance of providing illumination in relation to outboard motors on marine vessels and have further recognized that it is possible to provide such illumination by way of a lighting system provided on the outboard motor itself. Also, the present inventors have additionally determined that, because of the environmental conditions often experienced by outboard motors, which can for example entail exposure to high or persistent levels of ultraviolet radiation (UV), or exposure to materials or marine growth such as algae or barnacles that can impair the operation of light sources, it would be advantageous if in at least some embodiments the light sources of a lighting system of an outboard motor were shielded from the environment at least to some extent. The present inventors have additionally recognized that it would be possible, in at least some embodiments, to output desired light from an outboard motor, notwithstanding such shielding of the light sources, by additionally providing reflective components toward which light from the shielded light sources could be directed such that, upon the light being received at those reflective components, the light was in turn reflected outward away from the outboard motor by way of the reflective components. The present inventors have further recognized that, to facilitate the servicing and maintenance of the light sources in at least some such embodiments in which the light sources were shielded from the external environment, it would be appropriate to shield the light sources by panels or similar structures that were removable.

More particularly, in at least some embodiments, the present invention relates to a lighting system, where the lighting system is in an outboard motor having a cowling and configured for attachment to and use with a marine vessel. The lighting system includes a first cowling panel portion including a reflective strip portion, and a second cowling panel portion that, in combination with the first cowling panel portion, at least partly defines an interior region within the cowling. The lighting system also includes a lighting source, where the lighting source is supported on one or more of the first cowling panel portion, the second panel portion, or a further panel portion, within the interior region. The lighting source is positioned so that, when operating, first light is emitted toward the reflective strip portion. Also, the reflective strip portion is configured so that, upon the first light reaching the reflective strip portion, at least some of the first light is directed outward away from the cowling. In at least some such embodiments, the lighting source is a lighting source strip including a plurality of light sources, and the lighting source strip is positioned so that the light sources, when operating, emit the first light toward the reflective strip portion.

Further, in at least some embodiments, the present invention relates to an outboard motor configured for attachment to and use with a marine vessel. The outboard motor includes an upper portion at which is positioned an internal combustion engine that provides rotational power output via a crankshaft, and a lower portion at which is positioned a gearcase supporting a propeller shaft and propeller. The outboard motor also includes a mid portion at which is positioned at least one transmission component that allows for transmission of at least some of the rotational power output to the gearcase, and a cowling that extends around at least a portion of the outboard motor so as to form a housing therefore, the cowling including a plurality of light sources supported within interior regions formed within the cowling. The cowling additionally includes at least one reflective portion, where the light sources are arranged to emit light toward the at least one reflective portion, and the at least one reflective portion is configured so that, upon receiving the light, at least some of the light is directed outward away from cowling.

Additionally, in at least some embodiments, the present invention relates to a method of operating a lighting system on an outboard motor configured for use with a marine vessel. The method includes providing a set of light sources arranged within an interior region of a cowling, actuating the light sources to emit light toward a light strip, and reflecting the light at the light strip so that the light is emitted in a direction away from the cowling.

Further, in at least some embodiments, the present invention relates to a lighting system in an outboard motor having a cowling and configured for attachment to and use with a marine vessel. The lighting system includes a first cowling panel portion including a first reflective portion, and a second cowling panel portion that, in combination with the first cowling panel portion, at least partly defines an interior region within the cowling. The lighting system also includes a first lighting source, where the lighting source is supported on one or more of the first cowling panel portion, the second panel portion, or a further panel portion, within the interior region, where the second cowling panel includes a blocking portion that serves to at least partly shield the lighting source from exposure to an outside environment, and where the second cowling panel is detachable from the first cowling panel to allow for direct exposure of the lighting source to the outside environment, whereby cleaning or other servicing of at least some of the lighting source is facilitated. In at least some such embodiments, the first lighting source is a first lighting source strip that includes a first plurality of light sources, and the at least some of the lighting source includes either the lighting source strip or one or more of the light sources.

Additionally, in at least some embodiments, the present invention relates to a cowling for an outboard motor configured for attachment to and use with a marine vessel. The cowling includes a first panel structure, and a second panel structure that is detachably coupled to the first panel structure, where a gap exists between an edge of the second panel structure and the first panel structure, and where a first portion of the panel structure extends inwardly of the second panel structure such that the second panel structure shields the first portion from an external environment. The cowling also includes a light source positioned within an interior region of the cowling, and a reflective portion formed on the first panel structure, where at least some light emitted from the light source is reflected off of the reflective portion and directed through the gap to the external environment. Also, in at least some embodiments, the present invention also relates to an outboard motor with such a cowling, or a marine vessel assembly with a marine vessel and such an outboard motor, and in at least some additional embodiments relates to an overall lighting system that also includes a lighting control system.

Further, in at least some embodiments, the present invention also relates to a method of implementing a lighting system in relation to an outboard motor configured for use with a marine vessel. The method includes attaching a lighting source to a surface of an inner wall structure, providing a reflective surface on the inner wall structure or an additional structure that is exposed to an outside environment, and coupling a further wall structure to the inner wall structure so that an interior region is defined partly by the inner wall structure and the further wall structure. In at least some such embodiments, the lighting source is a lighting source strip that includes multiple light sources.

Additionally, in at least some embodiments, the present invention relates to a lighting system in an outboard motor having a cowling and configured for attachment to and use with a marine vessel. The lighting system includes a first cowling panel portion configured to at least partly surround an internal region in which are positioned one or more internal components of the outboard motor, and having a first surface that is substantially outwardly facing away the internal region. The lighting system also includes a light pipe having a first end and a second end, the light pipe extending along the first surface and through an orifice in the first cowling panel portion such that a first portion of the light pipe is positioned along the first surface outside of the internal region and a second portion of the light pipe including the first end is within the internal region. The lighting system additionally includes a light source arranged at the first end, within the internal region, where the light source is substantially shielded from ultraviolet radiation existing externally of the outboard motor and where the orifice and light pipe are configured so that the light pipe can be withdrawn via the orifice. In at least some such embodiments, the first cowling panel portion additionally has a second surface that is substantially inwardly facing toward the internal region.

Further, in at least some embodiments, the present invention relates to an outboard motor having a cowling and configured for attachment to and use with a marine vessel. The lighting system includes a cowling, and a light source supported in relation to the cowling. Additionally, the light source is positioned in relation to the cowling so that, and the cowling is configured so that, the light source is at least partly shielded from an exterior environment by the cowling or one or more portions thereof, and also at least some light emitted from the light source upon being reflected or refracted is able to escape or pass to an external location outside of the cowling, at which at least a portion of the at least some light is viewable.

BRIEF DESCRIPTION OF THE DRAWINGS

FIG. 6 is a right side perspective view of a vent cover of the cowling of FIG. 2, with the vent cover being shown independently of the remainder of the cowling;

FIG. 7 is a partly right side perspective view and a partly right side cross-sectional view of a rear cutaway portion of the vent cover of FIG. 6, where the cross-section is taken along line 7-7 of FIG. 6 so as to reveal outer and inner panels forming the vent cover as well as to reveal a channel thereof within which light sources are provided;

FIG. 8 is a cross-sectional view of an example fastener coupling an outer panel and an inner panel of a cowling such as the outer and inner panels forming the vent cover of FIG. 6;

FIG. 16 is a cutaway top plan view of the marine vessel and outboard motor of FIG. 1 that further schematically illustrates features of a control system by which light sources (e.g., light sources such as those of FIG. 9) on the outboard motor are controlled;

FIG. 17 is an additional schematic view illustrating features of the control system in relation to the light sources as implemented on the marine vessel and outboard motor of FIG. 16;

FIG. 18 is a further schematic view illustrating a mobile device intercommunicating with the outboard motor of FIG. 1 (with the marine vessel not shown);

DETAILED DESCRIPTION OF THE PREFERRED EMBODIMENT

Figure 1:
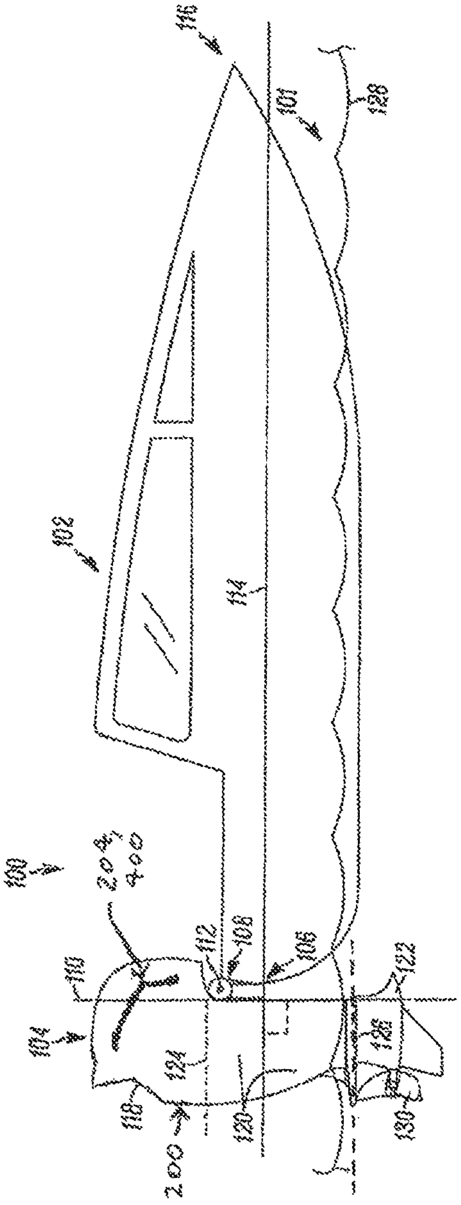
FIG. 1 is a schematic view of an example marine vessel assembly including an example outboard motor including a lighting system in accordance with at least one embodiment disclosed herein.

Referring to FIG. 1, an example marine vessel assembly 100 is shown to be floating in water 101 and includes, in addition to an example marine vessel 102, an example outboard motor marine propulsion system 104, which for simplicity is referred to below more simply as an outboard motor 104. As shown, the outboard motor 104 is coupled to a stern (rear) edge or transom 106 of the marine vessel 102 by way of a mounting system 108. In the present embodiment shown, the marine vessel 102 is shown to be a speed boat although, depending upon the embodiment, the marine vessel can take a variety of other forms, including a variety of yachts, other pleasure craft, as well as other types of boats, marine vehicles and marine vessels. Additionally in the present embodiment and as described in detail below, the outboard motor 104 particularly includes a lighting system 150 having a variety of features and that is represented in FIG. 1 by one region alongside the outboard motor from which light is emitted due to operation of the lighting system.

The mounting system 108 can be considered to be part of the outboard motor 104 although one or more components of the mounting system can technically be assembled directly to the stern edge (transom) 106 and thus could also be viewed as constituting part of the marine vessel 102 itself. The mounting system 108 allows the outboard motor 104 to be steered about a steering (vertical or substantially vertical) axis 110 relative to the marine vessel 102, and further allows the outboard motor 104 to be rotated about a tilt or trimming axis 112 that is perpendicular to (or substantially perpendicular to) the steering axis 110. As shown, the steering axis 110 and trimming axis 112 are both perpendicular to (or substantially perpendicular to) a front-to-rear axis 114 generally extending from the stern edge 106 of the marine vessel toward a bow 116 of the marine vessel.

The outboard motor 104 can be viewed as having an upper portion 118, a mid portion 120 and a lower portion 122, with the upper and mid portions being separated conceptually by a plane 124 and the mid and lower portions being separated conceptually by a plane 126 (the planes being shown in dashed lines). Although for the present description purposes the upper, mid and lower portions 118, 120 and 122 can be viewed as being above or below the planes 124, 126, these planes are merely provided for convenience to distinguish between general sections of the outboard motor, and thus in certain cases it may be appropriate to refer to a section of the outboard motor that is positioned above the plane 126 (or plane 124) as still being part of the lower portion 122 (or mid portion 120) of the outboard motor, or to refer to a section of the outboard motor that is positioned below the plane 126 (or plane 124) as still being part of the mid portion 120 (or upper portion 118). Nevertheless, generally speaking, the upper portion 118 and mid portion 120 respectively can be understood as generally being positioned above and below the plane 124, respectively, while the mid portion 120 and lower portion 122 respectively can be understood as generally being positioned above and below the plane 126, respectively.

Further, each of the upper, mid, and lower portions 118, 120, and 122 can be understood as generally being associated with particular components of the outboard motor 104. In particular, the upper portion 118 is the portion of the outboard motor 104 in which the engine or motor of the assembly forming the outboard motor is entirely (or primarily) located. By comparison, the lower portion 122 is the portion that is (or at least some of which is) typically within the water during operation of the outboard motor 104 (that is, beneath a water level or line 128 of the water 101), and among other things includes a gear casing (or torpedo section), as well as a propeller 130 as shown (or possibly multiple propellers) associated with the outboard motor. The mid portion 120 positioned between the upper and lower portions 118, 122 can include a variety of components and, among other things in the present embodiment, includes transmission, oil reservoir, cooling and exhaust components, among others.

Although not shown in detail herein, the outboard motor 104 in some embodiments includes, or is provided in combination with, any one or more of the features disclosed in one or both of U.S. Pat. No. 8,460,041, which issued on Jun. 11, 2013 and is entitled "Large Outboard Motor for Marine Vessel Application and Related Methods of Making and Operating Same", and International Patent Application No.

PCT/US2014/016089, which was published on Aug. 21, 2014 as Publication No. WO 2014/127035 and is entitled "Outboard Motor Including Oil Tank Features", both of which are hereby incorporated by reference herein. Accordingly, in at least some embodiments, the engine of the outboard motor is a horizontal crankshaft engine and can further be such an engine that is suitable for automobiles, and in at least some other embodiments the engine of the outboard motor is a vertical crankshaft engine.

Among other things, the outboard motor 104 in the present embodiment particularly includes an outer housing or cowl or cowling 200, and it is on this cowling of the outboard motor that light sources of the above-mentioned lighting system are arranged and supported. The cowling 200 particularly is provided at, and serves to cover over and surround interior portions of the assembly forming the outboard motor in, the upper and mid portions 118 and 120 of the outboard motor 104. In at least some embodiments, the cowling 200 includes air inlet scoops (or simply air inlets) alongside surfaces thereof. Also, in at least some embodiments, the cowling 200 also includes exhaust bypass outlets, which can be rearward-facing oval orifices in the upper portion 118 of the outboard motor 104 extending into the cowling 200, and which can serve as auxiliary (or secondary) outlets for exhaust generated by the engine of the outboard motor 104. The cowling 200 can be made from any of a variety of materials including, for example, plastic, fiberglass, sheet molding (or moulding) compound or composite (SMC) material, stamped aluminum, and other metallic or non-metallic materials.

Turning next to FIGS. 2, 3, 4, and 5, respectively, right side elevation, right side perspective, rear elevation, and rear perspective views, respectively, are provided of the cowling 200. In the present embodiment, the cowling 200 is symmetrical or substantially symmetrical about a vertical plane from front to rear through the middle of the cowling, although in alternate embodiments this need not be the case. Accordingly, it will be understood that the left side elevation view of the outboard motor 104 in the present embodiment is a mirror image (or substantially a mirror image) of the right side elevation view provided in FIG. 2.

Figure 2:
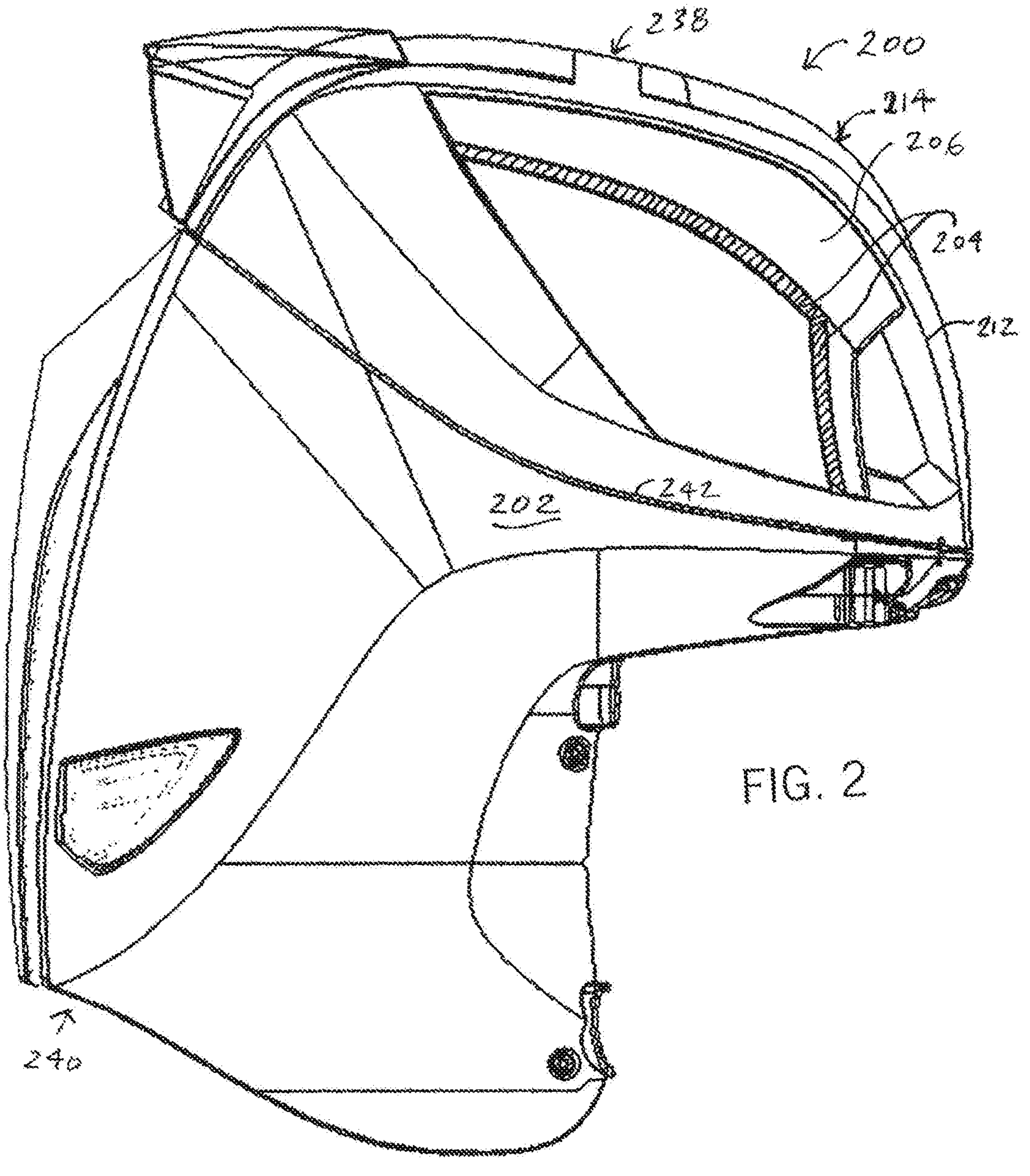
FIG. 2 is a right side elevation view of a cowling of the outboard motor of FIG. 1.

As shown in FIG. 2, the cowling 200 along a right side 202 thereof includes an inverted (in this case, when viewed as shown in FIG. 2, upside-down and backwards) L-shaped light strip or reflector 204. Although the light strip 204 is the portion of the lighting system 150 of the outboard motor 104 that was shown in FIG. 1, as discussed further below the lighting system 150 includes many other components in addition to the light strip 204. Additionally as will be described below, the light strip (or reflector) 204 is not itself a light source but rather is a portion of a right side surface 206 along the right side 202 of the cowling 200 at which light generated internally within the cowling is received and reflected so that the light can be viewed externally of the outboard motor 104 by an observer positioned to the right side of the cowling. To enhance the clarity of FIG. 2 in terms of its illustrating of the light strip 204 shown in FIG. 2, the region constituting the light strip 204 is shown to be cross-hatched (however, to be clear, the cross-hatching is merely intended to highlight the visible reflector portion of the light strip but is not intended to suggest that FIG. 2 is showing any cross-section). It should be appreciated that the light strip 204 can be formed as a beveled edge along the right side surface 206, or simply as a molded formation, or in other manners (e.g., as a specially-painted region of the right side surface). Although in the present embodiment the light strip 204 is simply a reflective (e.g. substantially mirror-like) structure, in other embodiments the light strip can also perform other optical operations upon light that reaches the light strip, such as focusing or refraction.

Figure 3:
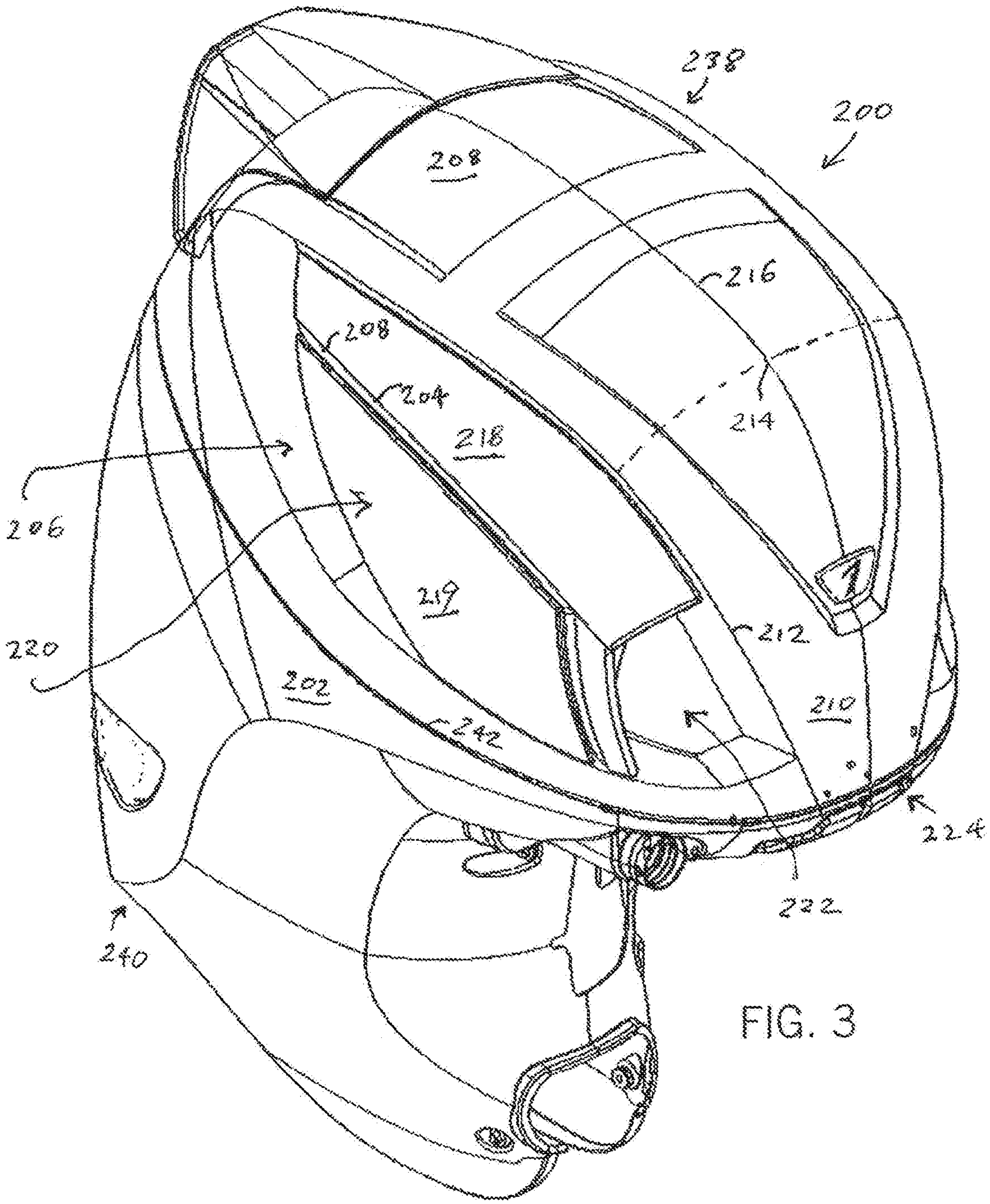
FIG. 3 is a right side perspective view of the cowling of FIG. 2.

Referring additionally to FIG. 3, a right side perspective view of the cowling 200 is additionally provided. From this view, not only the right side 202 of the cowling is visible, but also a top side 208 and front side 210 are also visible (or substantially visible). It will be appreciated that, given the curvature of the cowling 200, the exact boundaries between the right side 202, top side 208, and front side 210 can be defined in a variety of manners, but for purposes of the present description a first ridge 212 can be considered to constitute a boundary between the right side 202 and each of the top side 208 and front side 210, and a boundary between the top side 208 and the front side 210 can be considered to exist generally at a location (or dividing line) 214 shown in FIG. 3 and FIG. 2. It should additionally be appreciated that, because in the present embodiment the cowling 200 is symmetrical or substantially symmetrical about a vertical plane (where that plane cuts through the middle of the cowling, in a manner coinciding with a middle ridge 216 shown in FIG. 3), a left side perspective view of the cowling 200 would take the form simply of a mirror image (or substantially a mirror image) of the image of FIG. 3.

Figure 10:
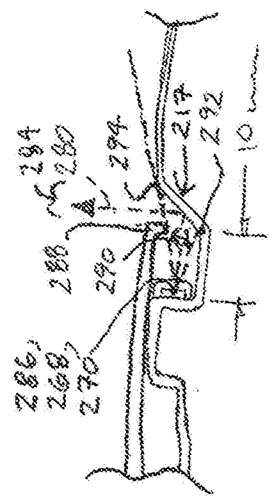
FIG. 10 is an additional cross-sectional view corresponding to a cutaway portion of the portion of the vent cover of FIG. 7, which is provided to additionally illustrate how light emanating from light sources such as those of FIG. 9 is directed in relation to a light strip (or reflector) formed along an inner panel of the vent cover.

As can be seen in FIG. 3 (and as will be discussed in further detail below with respect to FIGS. 7 and 10), the light strip 204 in the present embodiment is formed on an inwardly-slanted portion or surface 217 of the right side surface 206. The inwardly-slanted portion 217 particularly slopes inwardly (e.g., toward the interior of the cowling 200 or toward the vertical plane passing through the middle ridge 216) as one proceeds from an upper portion 218 of the right side surface 206 to a lower portion 219 of the right side surface. As described further below, although at its uppermost extent the inwardly-slanted portion 208 constitutes the outermost surface of the right side 202 of the cowling 200, the inwardly-slanted portion 208 eventually passes behind (that is, interiorly or inwardly behind) the lower portion 219 that then serves as the outermost surface of the right side 202 of the cowling as one proceeds further downwardly. As additionally shown in FIG. 3 (and as will be additionally appreciated from FIGS. 6 and 7), the upper and lower portions 218 and 219 of the right side surface 206 overall form a vent cover 220 that together with portions of the front side 210 of the cowling 200 form a vent opening 222 at or proximate a frontmost portion 224 of the cowling.

Figure 4:
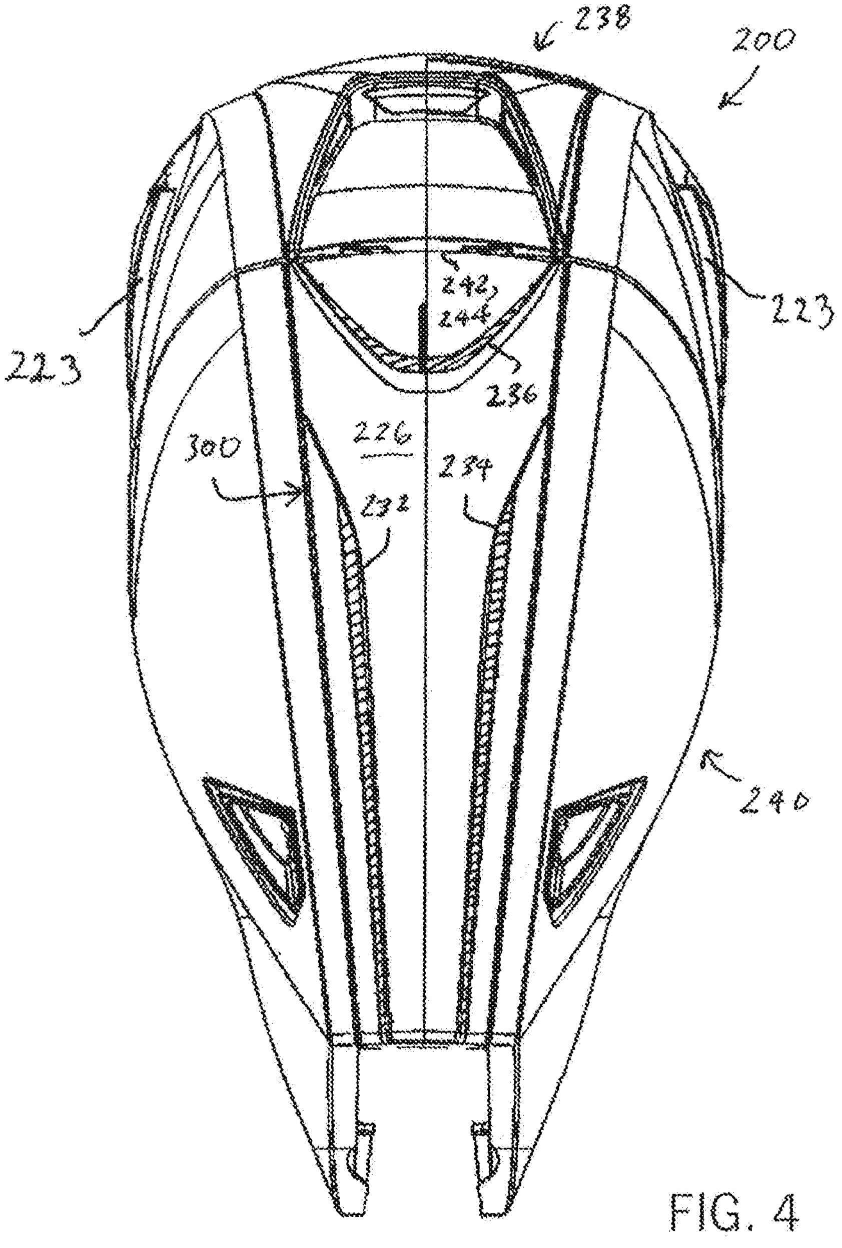
FIG. 4 is a rear elevation view of the cowling of FIG. 2.
Figure 5:
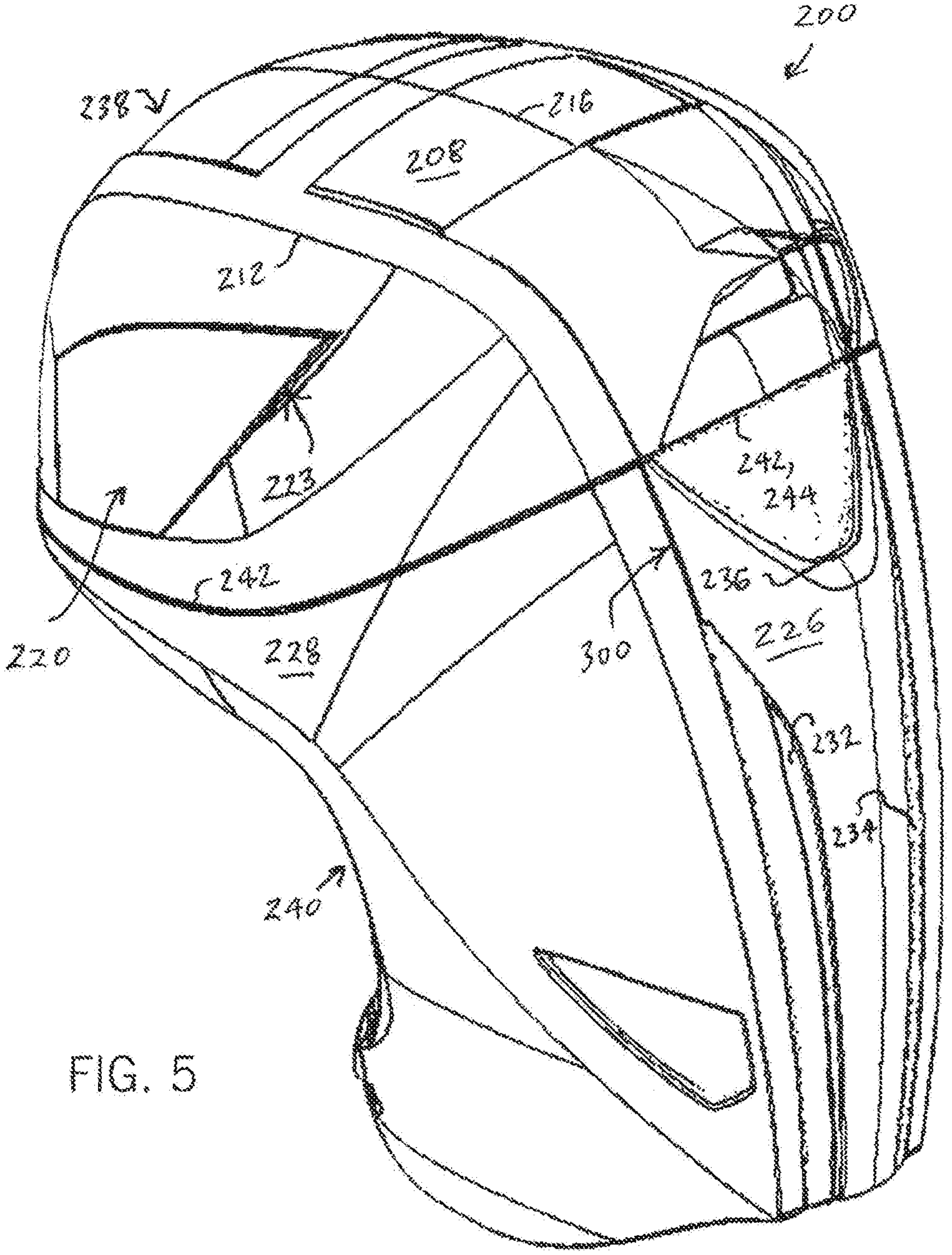
FIG. 5 is a rear perspective view of the cowling of FIG. 2.

Turning to FIGS. 4 and 5, respectively, rear elevation and rear perspective views of the cowling 200 respectively are additionally provided. The rear elevation view of the cowling 200 of FIG. 4 particularly shows a rear side 226 of the cowling. The rear perspective view of the cowling 200 of FIG. 5 shows not only the rear side 226 but also shows the top side 208 and a left side 228 of the cowling (which, as mentioned above, is in the present embodiment a mirror image or substantially a mirror image of the right side 202). Although not shown in detail, it should be appreciated that the left side 228 of the cowling 200 has a light strip that is a mirror image (or substantially a mirror image) of the light strip 204 and is formed on a left side surface with portions forming a vent cover having a shape that is the reverse of (e.g., a mirror image of) the vent cover 220. As with the vent cover 220, the vent cover on the left side 228, together with portions of the front side 210 of the cowling 200, also forms another vent opening that is the reverse of (e.g., a mirror image of) the vent opening 222. Further, in at least some embodiments, and in the particular embodiment shown in FIGS. 4 and 5, other vent openings 223 can be formed along the right side 202 and left side 228 at locations proximate the rear side 226 of the cowling 200. As shown, the other vent openings 223 can be formed by the vent covers 220 and other surfaces along the right side 202 and the left sides 228.

Further as shown in FIGS. 4 and 5, the rear side 226 of the cowling 200 additionally includes first, second, and third light strips 232, 234, and 236 that (as in FIG. 2) are highlighted in FIG. 4 by way of cross-hatching (again, the cross-hatching does not signify the presence of any cross-section). Again, as with the light strip 204, and as described further with respect to FIGS. 6, 7, 9, and 10, the light strips 232, 234, and 236 constitute portions of surfaces of the rear side 226 of the cowling 200 that receive light generated by light sources positioned inside of the cowling and in turn reflect light outward for viewing by an observer positioned rearwardly of the cowling 200. The light strips 232, 234, and 236 can be formed as beveled edges, or as molded formations, or in other manners (e.g., as specially-painted regions).

It should additionally be appreciated that, in the present embodiment, the cowling 200 is a hinged cowling having an upper portion 238 and a lower portion 240 that interface one another along a junction 242 and that are hingedly coupled along a rear portion 244 of the junction as particularly visible in FIGS. 4 and 5. Given this arrangement, the upper portion 238 of the cowling 200 can be hinged up out of the way without being removed, by lifting the front portion of the upper portion 238 away from the lower portion 240 and rotating the upper portion upward and rearward. In the present embodiment, the hinged upper portion 238 of the cowling 200 is coupled by a mechanical tether (not shown) to the lower portion 240 of the cowling 200 that is fixedly coupled to the remainder of the outboard motor 104 (or to another portion of the outboard motor) to prevent cowl ejection in the event of a strike of an underwater object while at operating speeds and, in some such embodiments, the mechanical tether is disposed opposite service access points of the engine. Also, in the present embodiment, the mechanical tether also includes electrical wiring by which electrical control signals can be communicated from the lower portion 240 of the cowling 200 to the upper portion 238 of the cowling, and particularly to lighting sources (discussed below) that are positioned on the upper portion 238 that allow for light to be emitted from the right side 202 and left side 228 of the cowling 200.

In alternate embodiments, the cowling (or the upper portion 238 thereof) is not hingedly coupled with respect to any other structure (such as the lower portion 240 of the cowling), and can be removed without being hinged up (rotated upward and toward the rear) first. However, in at least some such embodiments, there are electrical connectors positioned on each of the upper and lower portions of the cowling that are coaligned with one another and configured to be mechanically and electrically coupled with one another at least when the upper and lower portions of the cowling are assembled with one another. In some such embodiments, these electrical connectors are not only fully removable (detachable from one another when the upper and lower portions of the cowling are disassembled) but also the connection between the electrical connectors when the electrical connectors are coupled is fully watertight. Also, although in some embodiments the electrical connectors are configured to be disconnected particularly during servicing of the outboard motor, in other embodiments the electrical connectors are configured to facilitate disconnection under any circumstances. Further, even in embodiments where there is hinged coupling of the upper portion and lower portion of the cowling, the mechanical coupling and electrical wiring linking those two portions of the cowling can still encompass one or more mechanical coupling (hinge) structures and electrical connectors that permit the upper and lower portions to be fully disassembled, either during servicing or in other circumstances.

Again, by virtue of such various forms of electrical coupling between the upper and lower portions of the cowling, electrical control signals can be communicated to light sources that are positioned on the upper portion of the cowling from a lower portion of the cowling. It should be appreciated that, with respect to both embodiments in which the upper portion and lower portion of the cowling are hingedly attached and embodiments in which the upper portion and lower portion are fully detachable, the lower portion of the cowling (or internal portions of the outboard motor that are coupled to the lower portion of the cowling) can be equipped with one or more components that generate the electrical control signals to be directed to the upper portion of the cowling. Alternatively, the lower portion of the cowling (or internal portions of the outboard motor that are coupled to the lower portion) can receive such electrical control signals from other sources, such as an electrical control module positioned on the marine vessel to which the outboard motor is attached, as described further below. Alternatively, the electrical control module (or control means) can be integrated into the outboard motor, for example, in the form of an engine control unit (or ECU), or a wireless control device such as a radio frequency control module or handheld computer device or telephone.

Turning to FIGS. 6 and 7, the vent cover 220 and portions thereof are shown in more detail, in a manner that is independent of the remainder of the cowling 200. FIG. 6 particularly provides a right side perspective view of the vent cover 220 in its entirety, including the upper and lower portions 218 and 219 of the right side surface 206. FIG. 7 is a partly right side perspective view and a partly right side cross-sectional view of a rear cutaway portion of the vent cover 220 of FIG. 6. The cross-section shown in FIG. 7 is a cross-section taken along line 7-7 of FIG. 6, and is intended to reveal more particularly an inner panel 248 and an outer panel 250 that respectively form the upper portion 218 and lower portion 219 of the right side surface 206, respectively. FIG. 7 additionally shows how the inner panel 248 not only forms the upper portion 218 but also extends inwardly (behind) the lower portion 219 formed by the outer panel 250.

The inner panel 248 and outer panel 250 are held or fastened together and, depending upon the embodiment, this can be achieved in any of a variety of manners by way of any of a variety of types of fasteners or attachment mechanisms. Preferably, the inner and outer panels 248, 250 are attached together in a manner that generally avoids unintended detachment but that nevertheless allows the panels to be attached and detached in a rapid and efficient manner that is convenient for, for example, service technicians. Further in this regard, referring to FIG. 8, an additional cross-sectional view is provided of cutaway portions of the inner and outer panels 248, 250 that particularly also shows a fastening mechanism 252 by which the outer panel 250 is attached to the inner panel 248 in a manner that achieves the above goal related to the attachment and detachment of the panels with respect to one another. In this embodiment, the fastening mechanism 252 includes a protruding structure 254 that protrudes inwardly from an inner surface 256 of the outer panel 250 and that includes a shaft 258 with an enlarged head 260. Additionally, the fastening mechanism 252 also includes an annular receiving structure 262 that is supported on the inner panel 248 and that includes an orifice 264 that is configured to receive the shaft 258.

More particularly in this embodiment, the annular receiving structure 262 is a grommet (or O-ring) made of rubber (or another flexible material such as plastic) that fits within a larger diameter orifice 266 within the inner panel 248. The orifice 264 within the annular receiving structure 262 has a diameter that is substantially the same as the diameter of the shaft 258 but that is less than the diameter of the enlarged head 260. During assembly, due to the flexibility of the grommet forming the annular receiving structure 262, the enlarged head 260 is able to be pushed through the orifice 264 when the outer panel 250 is pushed toward the inner panel 248. Once the enlarged head 260 has passed through the orifice 264, the annular receiving structure 262 tends to prevent the enlarged head 260 from passing back out through the orifice 264 in a manner contrary to the manner in which it was inserted, and thus the outer panel 250 tends to be retained attached to the inner panel 248. Nevertheless, with sufficient pulling force, it is possible to cause the enlarged head 260 to pass back out through the orifice 264 such that the outer panel 250 can be disassembled from the inner panel 248.

Referring again particularly to FIG. 7, the cross-section taken along line 7-7 of FIG. 6 particularly also reveals an internal configuration of the inner panel 248 and outer panel 250 by which a lighting source strip 268 including multiple discrete light sources 270 is provided within a channel 272 between the inner and outer panels (where portions of the strip 268 and several of the light sources 270 are shown in phantom). As shown, the lighting source strip 268 particularly is supported upon an outwardly-extending indentation 274 of the inner panel 248. Depending upon the embodiment, the lighting source strip 268 and the light sources 270 can take a variety of forms.

Figure 9:
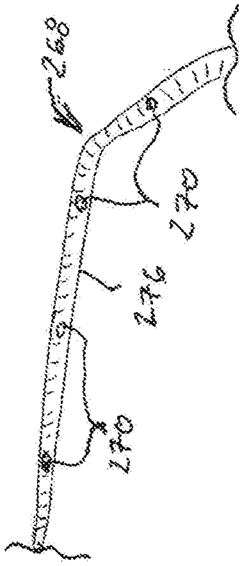
FIG. 9 is an illustration of an example series of light sources as can be implemented within the channel formed in the vent cover of claim 7.

In this regard, FIG. 9 is provided to show an example cutaway segment of the lighting source strip 268 that in the present embodiment (one example embodiment) is implemented on the vent cover 220 of FIG. 6 (shown in FIG. 9 in a manner independent from that vent cover). More particularly, in the present embodiment, the light sources 270 are light emitting diodes (LEDs) that are series-connected along the length of the lighting source strip 268. Also, although not required in all embodiments, in the present embodiment there are lenses (not shown) provided on the light sources 270 or on the lighting source strip 268 at the locations of the light sources 270 that allow for desired types of focusing or other optical effects to be achieved. Further, electrical connections or wiring between the light sources 270 is or are enclosed in a sheath 276 of electrically insulated and waterproof material (e.g., plastic) that extends along the length of the lighting source strip 268 and forms the general external appearance of the strip.

Notwithstanding the above description, in alternate embodiments the lighting source strip and associated light sources that emit light can take other forms. For example, in some alternate embodiments, the light sources can be other types of lighting devices such as conventional light bulbs or fluorescent light bulbs or light emitting diodes. The operating (or rated) power levels and voltage levels (or current levels) of the light sources that are employed, whether LEDs, light bulbs, or otherwise, can also vary depending upon the embodiment. For example, the rated voltage levels of the light sources employed can be 5 Volts, 8 Volts, 12 Volts, or 42 Volts, in various embodiments. Also for example, in some other alternate embodiments, the lighting source strip operates in relation to only a single light source (which again can be an LED, light bulb, etc.) or two light sources that is or are located at one or both ends of the lighting source strip. Additionally in such embodiments, the lighting source strip is an optical waveguide or light pipe structure that can communicate the light from those lighting sources(s) along the length of the lighting source strip, and the lighting source strip additionally includes formations (e.g., facets) along its length that allow amounts of the light communicated along its length to escape the lighting source strip at those formations as if those formations were distinct light sources themselves.

Referring still to FIG. 7, it should be appreciated that the light emitted by the light sources 270 of the lighting source strip 268 may not be directly viewed from locations external to the outboard motor 104 or the cowling 200 thereof due to the presence of the outer panel 250 and particularly due to a blocking portion 278 of the outer panel. As shown, the blocking portion 278 extends vertically upward past the lighting source strip 268 toward (but not all of the way to) the upper portion 218 of the right side surface 206 forming the light strip (reflector) 204. Nevertheless, light emitted from the light sources 270 can still be viewed by one or more observers positioned externally of the cowling 200 after reaching the observers in an indirect manner. As represented by an arrow 280, light emitted from the light sources 270 can reach the light strip 204 and then be reflected off the light strip 204 and outward away from the right side surface 206 (and thus away from the cowling 200 and the outboard motor 104) so that the light can then be viewed by one or more observers, who/which are represented figuratively by an eye 282. That is, light emitted from the light sources 270 can escape from the interior channel 272 and out beyond the cowling 200 by passing through a gap 284 formed between the light strip 204 and the blocking portion 278 after being reflected off of the light strip 204.

Although the arrow 280 is provided to illustrate an exemplary path of light emitted from the light sources 270 (or more particularly from a first one of the light sources 270, shown as a first light source 286) toward the light strip 204 and then through the gap 284 and out away from the cowling 200, this light path is only exemplary. That is, it should be appreciated that the light emitted from the first light source 286 or any other one or more of the light sources 270 can take a variety of paths identical (or parallel) to the path represented by the arrow 280 or differing from that represented by the arrow. The exact paths taken by light emitted from the light sources 270 can vary depending upon, for example, the exact angle of the light path of light exiting a given light source or the angle at which such light is incident upon the light strip 204. It should also be appreciated the term “observer” as used above in relation to the eye 282 is intended to broadly encompass both animate observers (e.g., human beings or animals or fish) as well as inanimate observers (e.g., machines employing machine vision or various types of cameras permitting viewing or sensing of light).

From FIG. 7, it should additionally be appreciated that the blocking portion 278 of the outer panel 250 serves to limit the range of angles of emitted light that can actually reach the light strip 204 on the right side surface 206 and be reflected outward way from the cowling 200 by the light strip 204 or by any other portion of the right side surface. More particularly, it should be appreciated from FIG. 7 that the blocking portion 278 not only extends vertically past the lighting source strip 268 toward the light strip (reflector) 204, but also includes an inwardly-directed lip 288 that covers over a portion of the channel 272. Referring additionally to FIG. 10, which shows a cross-sectional view of the vent cover 220 taken along line 10-10 of FIG. 7 that extends through the first light source 286, it should be appreciated that the inwardly-directed lip 288 particularly serves to limit the light that escapes from the channel 272 to the outside environment (outside the cowling 200) via the gap 284 to light that is emitted within an angular range 290. As shown, the angular range 290 extends from a first angular direction extending from the light source to an inner ridge 292 of the light strip 204 to a second angular direction extending from the light source to an outer ridge 294 that marks the outermost extent of the light strip 204 (which in this embodiment marks the location at which the inwardly-slanted portion 217 begins to slant inwards).

Therefore, light emitted from the first light source 286 that is emitted at an angle outside of the angular range 290 in a direction beyond the bound set by the outer ridge 294 is blocked from proceeding outward to the outside environment beyond the cowling 200 by the blocking portion 278 and in particular the inwardly-directed lip 288 thereof. Further, light emitted from the first light source 286 that is emitted at an angle outside of the angular range 290 in a direction beyond the bound set by the inner ridge 292 also cannot escape from the channel 272 to the outside environment due to the absence of a reflector serving to direct that light outward and also further due to the blocking portion 278. By comparison, again as shown in FIG. 10, light emitted at an angle within the angular range 290 such as light following the light path represented by the arrow 280 is reflected and directed through the gap 284 and thereby proceeds outward away from the cowling 200 and the outboard motor 104 such that the light can be viewed by one or more observers.

Figure 11:
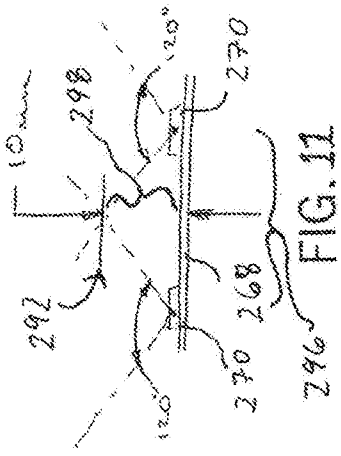
FIG. 11 is a schematic illustration of light emanating from a pair of neighboring light sources along the series of light sources of FIG. 9 in relation to an opposed wall structure that can be formed by the light strip (or reflector) of FIG. 10, which is provided to illustrate an example relative positioning of the light sources relative to one another and relative to the opposed wall structure that provides a desired substantially continuous lighting effect.

Turning to FIG. 11, an additional schematic illustration is provided that again shows several (in this case, two) of the light sources 270 along the lighting source strip 268. FIG. 11 particularly shows how a spacing 296 between adjacent ones of the light sources 270 compares relative to a spacing or distance 298 that exists between the lighting source strip 268 (and light sources 270 thereof) and the inner ridge 292 that constitutes the beginning of the light strip 204 as it proceeds from the inner ridge 292 to the outer ridge 294. In the example illustration shown, each of the light sources 270 is shown to emit light across a 120 degree angular range (that is, a range that extends 60 degrees in both clockwise and counter-clockwise directions relative to a direction normal to the length of the lighting source strip 268. In this example embodiment, further, the distance 298 is shown to be 10 millimeters, although in other embodiments this can vary from the distance shown. This 10 millimeter distance is likewise shown in FIG. 10.

In particular, it should be appreciated that the positioning of the light sources 270 relative to one another and relative to the distance between the lighting source strip 268 and the inner ridge 292 can have a significant effect upon the appearance of the light that is reflected off of the light strip 204 and visible to one or more observers. In the example of FIG. 11, the distance 298 is set exactly such that, given the angular range of light emission (that is, 120 degrees) of each of the light sources 270 and the spacing 296 between sequentially successive or neighboring ones of the light sources 270, the inner ridge 292 is located relative to the lighting source strip 268 precisely so that the outer bounds of the emitted light from neighboring ones of the light sources 270 exactly cross one another at the inner ridge 292 as shown in FIG. 11. However, it can be appreciated that, if the distance 298 was somewhat smaller and other aspects of the arrangement of FIG. 11 remained the same, then (given the particular angular ranges of light emission shown) the outer bounds of the light emitted from neighboring ones of the light sources 270 would respectively encounter the inner ridge 292 at locations that were separated from one another by a certain distance. Alternatively, it can be appreciated that if the distance 298 was somewhat larger than that shown and all the other features of FIG. 11 remained the same, then the outer bounds of the light emitted from neighboring ones of the light sources 270 would cross one another prior to the light reaching the inner ridge 292.

From this analysis, it should be appreciated that, if the spacing 298 between the light sources 270 of the lighting source strip 268 and the inner ridge 292—or, more generally, between the light sources of the lighting source strip and the location of reflection, which in this case can be anywhere along the light strip 204 between the inner ridge 292 and the outer ridge 294—is too small, then the reflected light emanating from the light strip 204 will have varying intensity along the length of the light strip 204 and particularly there will be regions along the length of the light strip where there is little or no light emanating from those regions. Alternatively, it can be appreciated from FIG. 11 that, if the distance 298 is greater than that shown in FIG. 11, then (due to the overlapping of light rays from adjacent ones of the lighting sources 270), the light emitted from the light strip 204 will have a constant or substantially constant intensity along the length of the light strip 204 as viewed by one or more of the observers. Thus, in general, the light strip (reflector) 204 should be positioned at a location relative to the light sources 270 that is after or beyond the intersection of the light emitted from neighboring light sources in order to produce light output from the cowling that is constant or substantially constant in intensity over the entire region from which the light is emitted.

Notwithstanding the above discussion regarding FIGS. 6-11 focused upon the light strip 204 and associated features of the cowling 200 along the right side 202 of the cowling that allow for light to be directed outward from that right side, the cowling in the present embodiment also includes a corresponding (complementary) light strip and corresponding (complementary) associated features along the left side 228 of the cowling as well, so as to allow for light to be provided along (and directed outward from) that left side. It should particularly be appreciated that the left side 228 of the cowling 200 includes all of the same structures described above with respect to FIGS. 6-11 that allow for the generation of desired light output via the light strip 204, except insofar as those structures are mirror (or substantially mirror) images of the structures described with respect to FIGS. 6-11. Thus, the left side 228 not only includes an inverted L-shaped light strip but also inner and outer panels respectively corresponding to the inner and outer panels 248 and 250. Also, on the left side 228, the inner panel supports a lighting source strip with light sources corresponding to the lighting source strip 268 and the light sources 270, which again are provided within a channel corresponding to the channel 272. Further, on the left side 228, a blocking portion with an inwardly-directed lip corresponding to the blocking portion 278 with the inwardly-directed lip 288 is configured to prevent direct light emission from the light sources to locations outward of the left side 228 and to permit indirect light emission that is provided via reflection off of the light strip on that left side.

Figure 12:
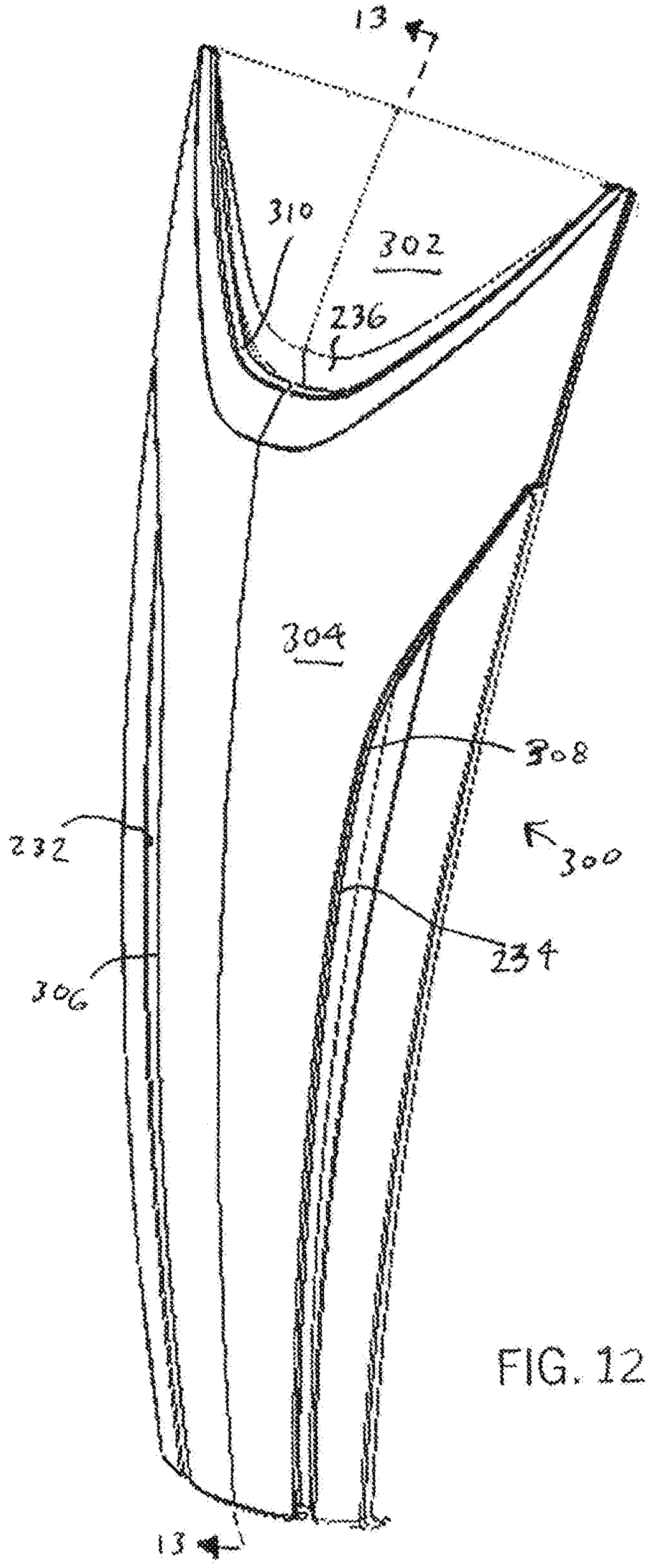
FIG. 12 is a rear perspective view of a central section assembly of a rear side of the cowling of FIG. 2.

Additionally, as already described above in relation to FIGS. 3 and 4, in the present embodiment the cowling 200 not only includes light strips and associated features for providing lighting along the right and left sides 202 and 228, but also includes the light strips 232, 234, and 236 along the rear side 226 of the cowling 200. FIGS. 12, 13, 14, and 15 are provided to show different portions of a central (or "razorback") section assembly 300 of the rear side 226 (which also is shown in FIGS. 3 and 4) on which are provided the light strips 232, 234, and 236 and related structures that allow light to be emitted from the rear side 226 indirectly after being reflected off of those light strips. Similar to the description above concerning the inner and outer panels 248 and 250, the central section assembly 300 of the rear side 226 includes both an interior portion (which can be an inner panel) 302 and an exterior portion (which can be an outer panel) 304. FIG. 12 particularly shows a rear perspective view of the central section assembly 300 and the interior and exterior portions 302 and 304 thereof, and FIG. 13 additionally provides a cross-sectional view of that assembly taken along the longitudinal centerline of the assembly (line 13-13 of FIG. 12). Further, FIGS. 14 and 15 respectively show rear perspective views of the exterior and interior portions 304 and 302, respectively, independent of one another.

Figure 13:
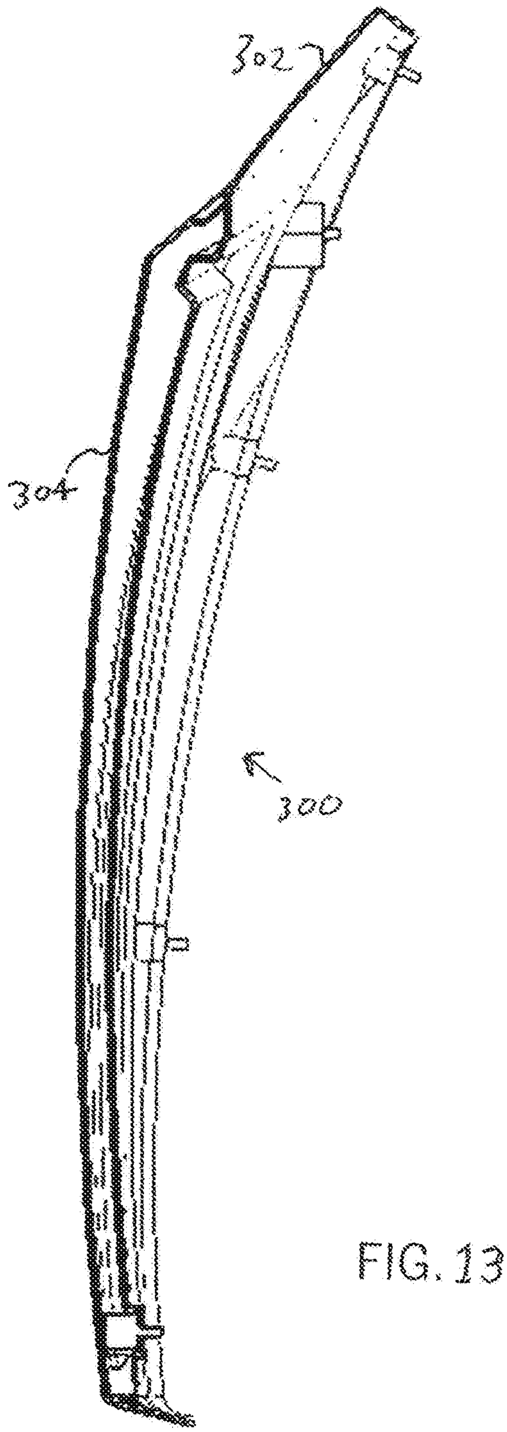
FIG. 13 is a cross-sectional view of the central section assembly of FIG. 12, taken along line 13-13 of FIG. 12.
Figure 14:
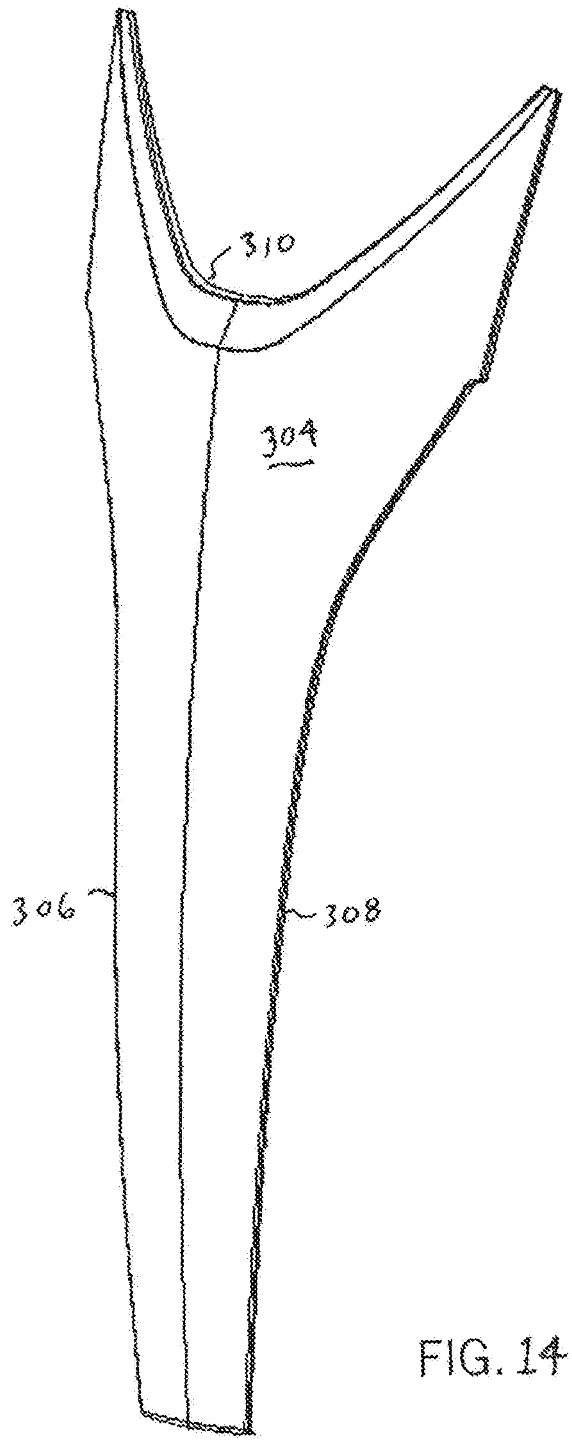
FIG. 14 is a rear perspective of an exterior portion of the central section assembly of FIG. 12.
Figure 15:
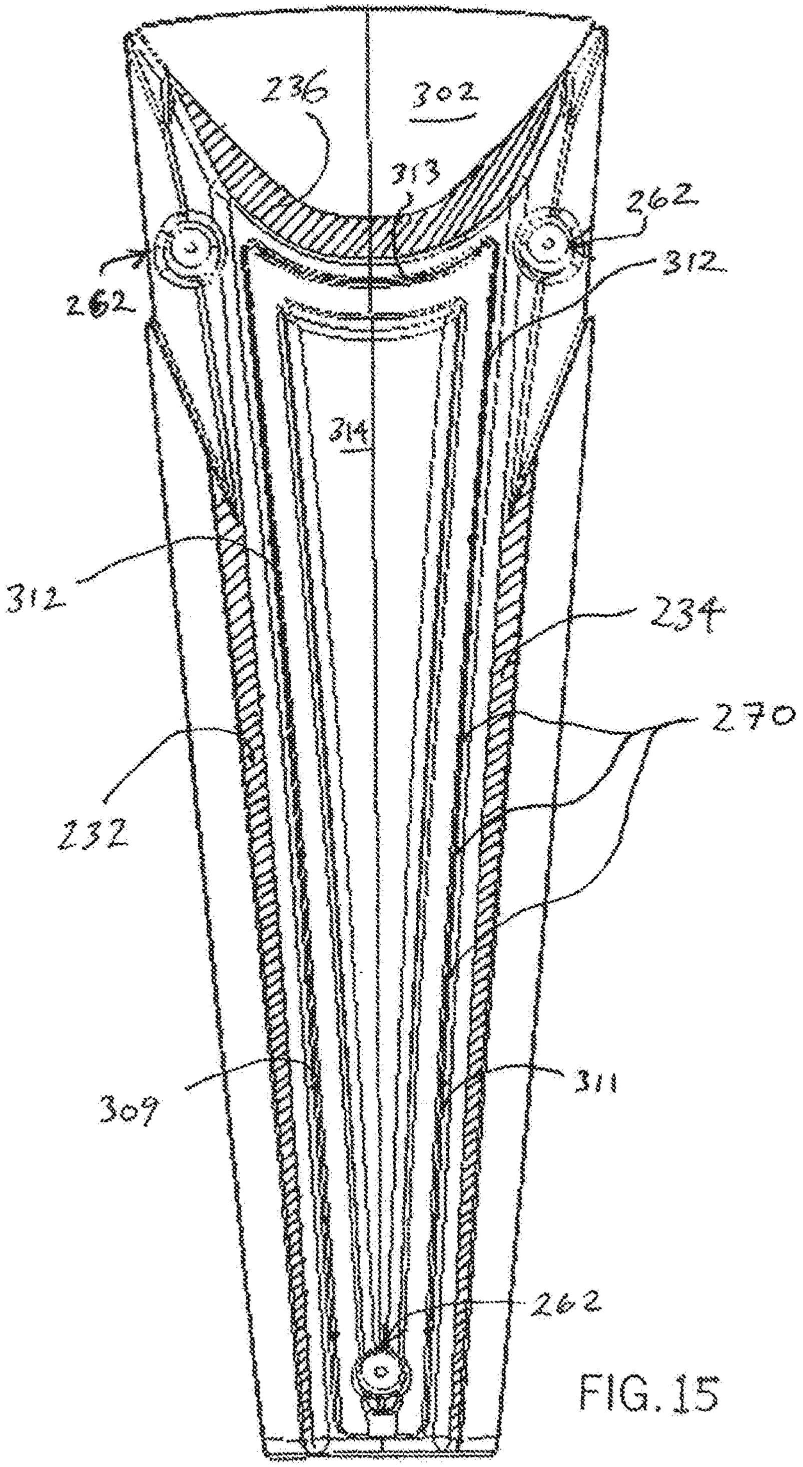
FIG. 15 is a rear elevation view of an interior portion of the central section assembly of FIG. 12, with the interior portion being shown independently of the exterior portion of FIG. 13.

As illustrated in FIGS. 12, 13, and 14, the exterior portion 304 is a Y-shaped structure. Further, as particularly shown in FIG. 12, the exterior portion 304 has an area dimension that is less than that of the interior portion 302 such that the light strips 232, 234, and 236, which are portions of the interior portion 302, are respectively visible along a left edge 306, a right edge 308, and a top edge 310 of the exterior portion 304, respectively. Additionally, as illustrated in FIG. 15, the interior portion 302 includes a lighting source strip 312 that has substantially the shape of an inverted U, and that particularly includes a left section 309, a right section 311, and a top section 313. The left section 309 extends substantially parallel alongside the first light strip 232, with the first light strip being generally to the left of the left section 309, the right section 311 extends substantially parallel alongside the second light strip 234, with the second light strip being generally to the right of the right section 311, and the top section 313 extends substantially parallel alongside the third light strip 236, with the third light strip being generally above the top section 313.

Additionally, the exterior portion 304 includes blocking portions along the left edge 306, right edge 308, and top edge 310 that extend over and overhang the lighting source strip 312 formed on the interior portion 302 and particularly the left section 309, right section 311, and top section 313 thereof, respectively. Each of these blocking portions at the respective edges 306, 308, and 310 includes a respective inwardly-directed lip portion or lip (which in this case is also forwardly-extending toward the front side 210 of the cowling 200) that prevents light emitted from the lighting source strip 312 to directly exit the rear side 226 of the cowling 200. Although not shown in FIG. 12, it should be appreciated that each of these inwardly-directed lips corresponds to, and is substantially similar in shape and function to, the inwardly-directed lip 288 of FIGS. 7 and 10. It should additionally be appreciated that the exterior portion 304 can be assembled to the interior portion 302 by way of any of the same types of fastening mechanisms that allow for the outer panel 250 to be assembled to the inner panel 248 along the right side 202 of the cowling 200, including in at least some embodiments the fastening mechanism discussed above with respect to FIG. 8. FIG. 15 particularly shows the interior portion 302 as having three receiving structures, which can be considered to be or substantially correspond to the annular receiving structures 262 of the fastening mechanisms 252 discussed above, and which allow for the exterior portion 304 to be assembled to the interior portion 302 (e.g., by way of the protruding structures 254 formed on the exterior portion).

As described above in relation to the right side 206 with respect to FIGS. 6, 7, 10, and 11, light emitted from the lighting source strip 312 (again see FIG. 15) cannot escape from the cowling 200 directly, but only can exit the cowling indirectly after being reflected off of that one of the light strips 232, 234, or 236 proximate to which each respective one of the left, right, and top sections 309, 311, and 313 of the lighting source strip 312 is proximate. That is, the description provided above with respect to FIGS. 6, 7, 10, and 11 is not only pertinent to lighting operation occurring on the right side 202 (as well as the left side 228) of the cowling 200, but also is pertinent with respect to the lighting operation at the rear side 226 of the cowling 200.

It should also be understood that the lighting source strip 312 in the present embodiment includes several of the light sources 270, which are represented figuratively by dots shown in FIG. 15 (but not drawn to scale). The light sources 270 of the lighting source strip 312 can be spaced along the length of the lighting source strip in the same manner that the light sources 270 are spaced along the lighting source strip 268 as described above in relation to FIG. 9 (again, however, the spacing shown in FIG. 15 is not intended to be representative of the actual spacing of light sources). The light sources 270 of the lighting source strip 312 can take any of the same forms as discussed above with respect to the light sources of the lighting source strip 268. Also, the other characteristics and features of the lighting source strip 312 (other than the particular inverted U shape of the implementation of that strip) can be identical or substantially the same as those described above in regard to FIG. 9 or otherwise with respect to the lighting source strip 268.

Relatedly, the description provided above in relation to FIG. 11, regarding how the spacing of neighboring ones of the light sources 270 along the lighting source strip 268 relative to the spacing between the lighting source strip 268 and the inner edge 292 (or other locations on the light strip 204) affects the appearance of light emanating from the light strip 204, is equally pertinent to the spacing of the light sources 270 of the lighting source strip 312. That is, although not shown in detail, the spacing of neighboring ones of the light sources 270 of the lighting source strip 312 along the length of the lighting source strip should be sufficiently close together, relative to the distance between the lighting source strip and the respective light strip 232, 234, or 236 toward which light is being directed from the lighting source strip, such that the light emitted by such neighboring ones of the light sources overlaps prior to that light reaching the respective light strip 232, 234, or 236. With such an arrangement, the light emanating outward from the rear side 226 of the cowling after being reflected by the light strips 232, 234, and 236 appears to be of substantially constant intensity along the lengths of those light strips. Alternatively, if the spacing between neighboring ones of the light sources 270 is sufficiently far apart that the light emitted from neighboring ones of the light sources does not coincide prior to reaching the respective one of the light strips 232, 234, 236, then the light emitted from the light strips appears to be of varying intensity along the lengths of those light strips.

The components described above with respect to FIG. 2 through FIG. 15 that allow for light to be generated and emitted from the right, left, and rear sides 202, 228, and 226 of the cowling 200, respectively, including the various light strips 204, 232, 234, 236 and lighting source strips 268 and 312, form portions of the lighting system 150 of the outboard motor 104 previously shown in FIG. 1. Nevertheless, referring additionally to FIGS. 16 and 17, it should be appreciated that the lighting system 150 forms part of an overall lighting system 400 that includes both the lighting system 150 of the outboard motor as well as a lighting control system 402 provided on the marine vessel 102. The lighting control system (or light controller) 402 particularly allows for an operator on the marine vessel (and/or possibly a computer on the marine vessel) to control the lighting operation of the lighting system 150.

FIG. 16 particularly provides a top plan view of the marine vessel assembly 100 with the marine vessel 102 in combination with the outboard motor 104 (with the marine vessel shown in cutaway), and figuratively illustrates that the overall lighting system 400 in relation to the marine vessel assembly. It should be appreciated that the lighting system 150, which is shown in phantom with dashed lines, both includes electrical components such as the light sources 270 and lighting source strips 268, 312 and also includes optical or other non-electrical components such as the light strips 204, 232, 234, and 236, blocking portions such as the blocking portion 278, and inwardly-directed lips such as the inwardly-directed lip 288 discussed above. The lighting system 150 as shown in FIG. 16 is intended to represent all of these electrical and optical or non-electrical components. Also as shown in FIG. 16, the lighting control system 402 particularly includes an electrical control module 406 as well as wiring or other electrical linkages 408 by which that control module is connected to the lighting system 150.

Turning additionally to FIG. 17, the lighting system 400 is shown in a simplified manner in electrical schematic form. It should be appreciated that the lighting system 400 as shown in FIG. 17 particularly reveals the electrical components of the lighting system 150 but does not show the optical or non-electrical components of the lighting system 150. That said, it can be seen in FIG. 17 that the lighting system 400 includes the both the lighting control system 400 and the lighting system 150. With respect to the lighting system 150, FIG. 17 particularly shows the lighting source strips 268 that are provided on the right side 202 and left side 228 of the cowling 200 including the light sources 270 thereof, as well as the lighting source strip 312 provided on the rear side 226 of the cowling including also the light sources 270 thereof. Additionally, the lighting system 150 is shown to include wiring or other electrical linkages 410 by which operation of the lighting source strips 268, 312 and light sources 270 thereof are governed.

Further as shown in FIG. 17, the lighting control system 402 includes the electrical control module 406, which is coupled between a ground terminal 412 and a power source 414, plus the wiring (or other linkages) 408 by which the control module 406 is coupled to the wiring (or other linkages) 410 of the lighting system 150. The control module 406 can take a variety of forms depending upon the embodiment but, as illustrated in FIG. 17, in at least some embodiments the control module includes each of a processor 416, a memory 418, and one or more user interface devices 420. The processor 416 can take any variety of forms including, for example, a microprocessor or other controller. The memory 418 can also take any of a variety of forms depending upon the embodiment and also the user interface devices 420 can take any of a variety of forms including a variety of buttons, display devices, touch screen devices, or other devices that allow for operators to provide input commands or receive information. In the present embodiment, the electrical control module 406 governs lighting operation of the light sources 270 of the lighting source strips 268 and 312 simply by controlling the amount of power (or voltage or current) supplied to the lighting source strips, and the wiring (or linkages) 408 and 410 merely serve to communicate power (or voltage or current) to the lighting source strips/light sources.

In the present embodiment, all of the lighting source strips/light sources are connected to the controller 406 in a manner such that all of the lighting source strips/light sources operate in unison. That is, if greater power (or current or voltage) is delivered to the lighting system 150, then all of the light sources 270 output light of greater intensity and thus the light emitted from the outboard motor 104 at each of the right side 202, left side 228, and rear side 226 increases an intensity. Alternately, if the power (or current or voltage) delivered by the control module 406 decreases, then all of the light sources 270 emit light of decreased intensity. Nevertheless, in other alternate embodiments, control can be exerted over the lighting source strips 268 and 312 or one or more of the light sources 270 in more complicated manners. For example, in some alternative embodiments, the light sources 270 at one of the lighting source strips 268 or 312 can be actuated independently of the light sources 270 of another one of the lighting source strips. Further, in some embodiments, one or more of the light sources 270 can be actuated an individualized or independent basis while other light sources are not actuated.

It should be appreciated that, depending upon the embodiment, the intensity (or dimming level) and other characteristics of the light emitted by the lighting system 150, such as the color that is displayed, or whether the light is continuously emitted or exhibits strobing effects, can vary, or can be controlled to vary, to a significant degree. Control over such operation can be governed by the electrical control module 406, possibly either in response to operator commands or automatically (or autonomously). For example, in some embodiments, each of the light sources 270 of a given one of the lighting source strips 268, 312, or each of the light sources of all of the lighting source strips, emit light at a single consistent intensity and color. In other embodiments, the intensity of all of the light sources 270 of a given one or more of the lighting source strips 268, 312 varies over time, or can be controlled to vary over time. Also, in further alternate embodiments, different ones of the light sources 270 can take on, or be controlled to take on, different intensities (dimming levels) from one another.

Further, in additional alternate embodiments, different ones of the light sources 270 emit light at, or can be controlled to emit light at, different colors. Indeed, depending upon the embodiment, any of a variety (e.g., theoretically up to an infinite number of permutations) of colors can be displayed. In some such embodiments, light sources positioned at different regions of the outboard motor can take on different colors. For example, light sources that provide white light can be employed as the light sources arranged along the rear side 226 of the outboard motor, light sources that provide red light can be employed as the light sources along the left (port) side 228 of the outboard motor, and light sources that provide green light can be employed as the light sources along the right (starboard) side 202 of the outboard motor. Also, in some such embodiments, in which there are several groupings of the light sources 270 where the light sources of each respective grouping are configured to emit light at a particular color that is different than the light emitted by the light sources of the other groupings, then the different groupings of light sources can emit light at, or can be controlled to emit light at, different times. In some such embodiments, the light output overall from the outboard motor can vary in color with time, as different colors are displayed from different sides or regions of the outboard motor.

Additionally, although operation of the lighting system to output light can vary, or be controlled to vary, in an automatic or preprogrammed manner or based upon received operator instructions, also in at least some embodiments operation of the lighting system to output light can vary, or be controlled to vary, in dependence upon any one or more of a variety of circumstances or sensed information. For example, in some embodiments, if the temperature of the outboard motor or the external environment is sensed by way of a temperature sensor associated with the outboard motor or the electrical control module 406 to have reached a particular threshold, in response to such temperature information the electrical control module can in turn cause variations in the light output by the outboard motor. For example, if the temperature is below a given threshold and is relatively cool, the light that is output can be blue, and if the temperature is above that given threshold or another threshold and is relatively warm, the light that is output can be red.

Also for example, in some embodiments, if movement, velocity, or acceleration is sensed by way of an accelerometer associated with the outboard motor or the electrical control module 406, in response to particular sensed movement, velocity, or acceleration information the electrical control module can in turn cause lighting intensity to increase or decrease. Further for example in this regard, if braking (deceleration) is sensed, the electrical control module can cause the intensity of the light of the light sources along the rear side 226 of the outboard motor to increase, or cause the light sources to switch from an off state to an on state, as an indication of braking. Also for example in this regard, the lighting can be controlled such that white light is emitted when there is movement but no light is emitted (or light of another color, such as red light, is emitted) when there is no movement. Further for example, the intensity, color, or strobing (or switching on and off) of the light that is output can vary depending upon the speed (e.g., rotations per minute or RPM) of the engine of the outboard motor, or light can be displayed in a manner that is indicative of and can communicate a message such as a fault, alarm, or SOS message (e.g., by switching on and off the lighting in Morse code).

Further, it should also be appreciated that, depending upon the embodiment or operational circumstance the light emanating from one or more of the light strips 204, 232, 234, and 236 of the cowling 200 can take on various special forms or provide various effects (e.g., effects visible to observers positioned external of the cowling) or even optical illusions. As already mentioned, depending upon the light sources that are employed, the light emitted from the light strips 204, 232, 234, and 236 can take on different colors. Additionally for example, because the light strips 232, 234 extended in a vertical direction downward to or toward (or even below) the location of the water line when the outboard motor 104 is within the water, in some operational circumstances the vertically-extending light pattern (line) emitted by the light strips 232, 234 can appear to observers as extending below the water line deep into (e.g., three feet below the water line) the water, even though the light strips 232, 234 do not extend so deeply into the water.

Notwithstanding the description provided with respect to FIGS. 16 and 17, in alternate embodiments it is not necessary for there to be a control module 406 and wiring 408 mounted on the marine vessel 102 in order to provide control over the operation of the lighting system of the outboard motor. For example, in FIG. 18, in one alternate embodiment, a mobile device 422 such as a smart phone or personal digital assistant can be used to provide control over a lighting system of an outboard motor 424. As shown, the outboard motor 424 differs from the outboard motor 104 of FIGS. 1, 16, and 17 insofar as the outboard motor 424 includes a wireless receiver 426 and associated control module 428 by which wireless signals communicated from the mobile device 422 can be received and used as a basis for controlling the lighting system components on the outboard motor. In this embodiment, the lighting system can be understood to include all of the same components as the lighting system 150 except that the lighting system components, rather than being coupled to the electrical control module 406 on the marine vessel 102, instead are coupled to the control module 428. Thus, in this embodiment, the mobile device 422 by way of wireless signals 430 allows for an operator interacting with that mobile device to provide commands that are received wirelessly by the receiver 426 and govern control over the lighting system by way of the control module 428.

It should be appreciated that the exact wireless communications medium or protocol that can be employed in embodiments such as that of FIG. 18 can vary depending upon the embodiment. It is intended that the present disclosure encompasses numerous different arrangements involving a wide variety of different wireless communication media or protocols including, for example, Wi-Fi communications and Bluetooth communications. It should also be appreciated that the mobile device 422, just as the control module 406, can display or otherwise provide information to an operator that not only facilitates the operator's controlling of the lighting system of the outboard motor 424 but also allows for the operator to monitor the status of that lighting system. Further, in other embodiments, wireless control over operation of the lighting system of an outboard motor can be provided by a control module that is operating automatically without involvement by any operator.

Figure 19:
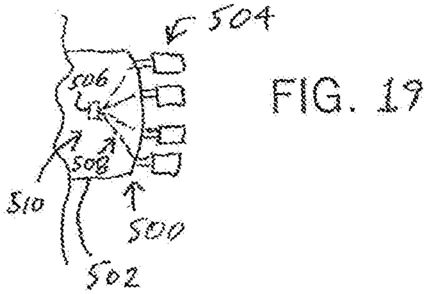
FIG. 19 is a cutaway top plan view of an additional marine vessel that is configured to support multiple (in this case, four) outboard motors, along with the outboard motors, and that further schematically illustrates features of a control system by which light sources (e.g., light sources such as those of FIG. 9) on the outboard motors are controlled.

Additionally, although the embodiments described above with respect to FIGS. 1-18 particularly envision an arrangement in which there is a single outboard motor such as the outboard motors 104 or 424 mounted on a marine vessel such as the marine vessel 102, this need not be the case in all embodiments. Rather, as illustrated by FIG. 19, in another alternate embodiment, a marine vessel assembly 500 can include not only a marine vessel 502 but also multiple (in this example, four) outboard motors 504. In such embodiment, the marine vessel 502 can again include an electrical control module 506 and wiring (or other electrical linkages) 508 forming a lighting control system (or light controller) 510 by which control is exerted over the lighting systems of each of the outboard motors 504, except in such embodiment the wiring 508 includes wiring (or other electrical linkages) that connect the control module to each of the respective four outboard motors. Although FIG. 19 shows an arrangement in which there are four outboard motors, it should be appreciated that in other embodiments there can be other than four outboard motors (e.g., two, three, or more than four outboard motors).

Figure 20:
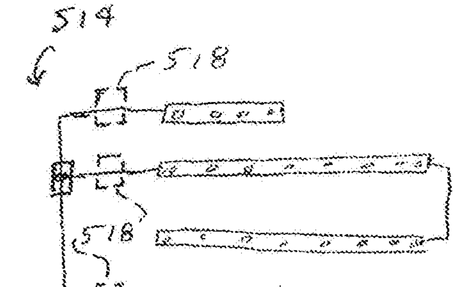
FIG. 20 is an additional schematic view illustrating features of the control system in relation to the light sources of the marine vessel and outboard motor of FIG. 19.
Figure 20:
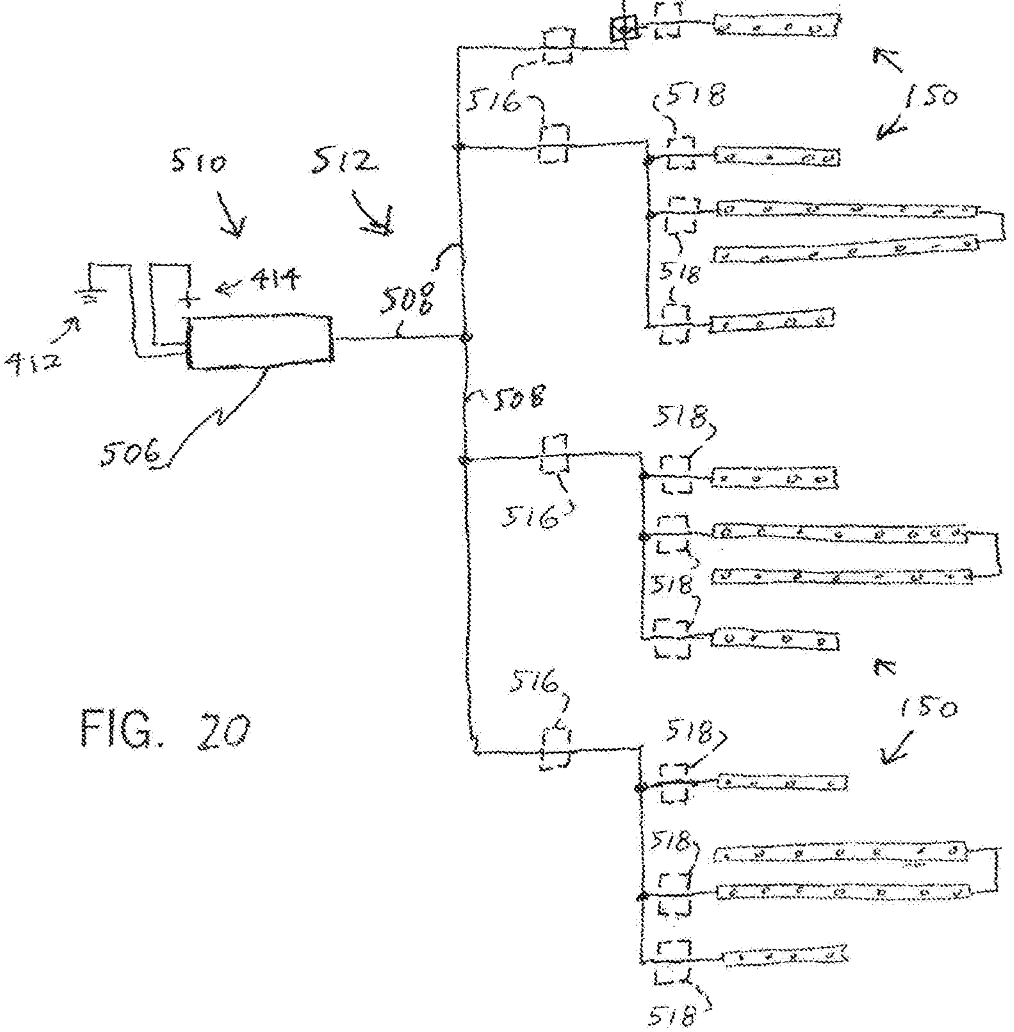

Referring additionally to FIG. 20, an additional electrical schematic similar to that of FIG. 17 is provided to further illustrate an overall lighting system 512 including both the lighting control system 510 provided on the marine vessel 502 as well as a combination 514 of four individual lighting systems that are provided on each of the four outboard motors 504. As illustrated, the control module 506 in this environment can again be coupled to the ground terminal 412 and the power source 414 and the control module can again include a processor, memory, and one or more user interface devices such as those described with respect to FIG. 17 (but not shown in FIG. 20). Also as illustrated, each of the lighting systems of the combination 514 of four lighting systems can take the form of the lighting system 150 described earlier with respect to FIG. 17. That is, each of the outboard motors 504 can have the same type of wiring system as is employed on the outboard motor 104 of FIG. 16, even though in this arrangement, there are multiple outboard motors that are supported on the same marine vessel. Also, it should be appreciated that the lighting systems of the combination 514 are electrically coupled in parallel with one another relative to the control module 506 and that each of the lighting systems 150 again includes both electrical and optical or other non-electrical components even though FIG. 20 particularly illustrates the electrical components of the lighting systems. As with the electrical control module 406, the electrical control module 506 can control numerous different types of operation including, among other things, light intensity, light color, and strobing effects.

Notwithstanding the above discussion, in alternate embodiments, the lighting systems employed on the outboard motors in an arrangement involving multiple outboard motors attached to the same marine vessel can be different from one another on the different outboard motors as well as be different from the lighting system 150 that is employed on an arrangement in which there is only a single outboard motor supported by the marine vessel. Indeed, the outboard motors in such an arrangement of multiple outboard motors need not all be the same type of outboard motor in other respects such as power output or otherwise. Also, in some alternate embodiments, the lighting systems of the outboard motors of such an arrangement of multiple outboard motors can be coupled in series relative to one another and the control module rather than being coupled in parallel as shown in FIG. 20. Further, although not shown, it should be appreciated that in other embodiments, a mobile device such as the mobile device 422 of FIG. 18 can be used to control the lighting systems employed on multiple outboard motors in an arrangement where multiple outboard motors are supported by a single marine vessel.

Additionally as illustrated by connectors 516 and 518 shown in FIG. 20, in at least some embodiments the overall lighting system 512 can include connectors that allow for different ones of the lighting systems 150 and components thereof to be independently coupled to and decoupled from one another and the lighting control system 510. These connectors are optional depending upon the embodiment, as illustrated by the portrayal of the connectors 516 and 518 in phantom, and can be considered to be service removable components. More particularly as shown, in at least some embodiments each of the lighting systems 150 as a whole can be respectively and independently coupled to or decoupled from the lighting control system 510 by way of a respective one of the connectors 516, which can be referred to as outboard light connectors. Additionally, in at least some embodiments each of (or one or more of) the respective lighting source strips (or lighting sources) of each of the respective lighting systems 150 can be coupled to and decoupled from the remainder of the respective lighting system (and also from the corresponding one of the outboard light connectors as represented by the respective connectors 516) by way of a respective one of the connectors 518, which can be referred to as individual light connectors. It should be appreciated that, in an overall lighting system such as the overall lighting system 512 of FIG. 20 in which all of the illustrated ones of the connectors 516 and 518 are present, one or more remaining portions of the overall system (particularly those portions that remain coupled to the lighting control system 510) can continue to operate even when one or more other portions of the overall system are disconnected.

Figure 22:
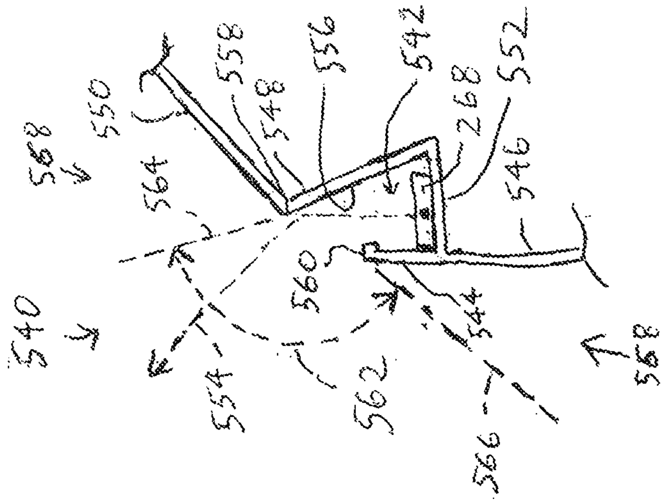
FIGS. 21-26 are additional cross-sectional, partly cutaway views of alternate embodiments of arrangements of cowlings and associated lighting sources differing in certain respects from the embodiment of FIGS. 6, 7, and 8.
Figure 23:
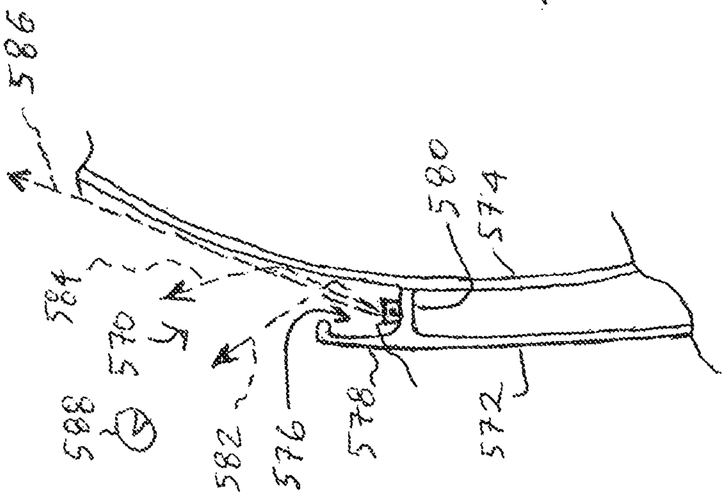
Figure 21:
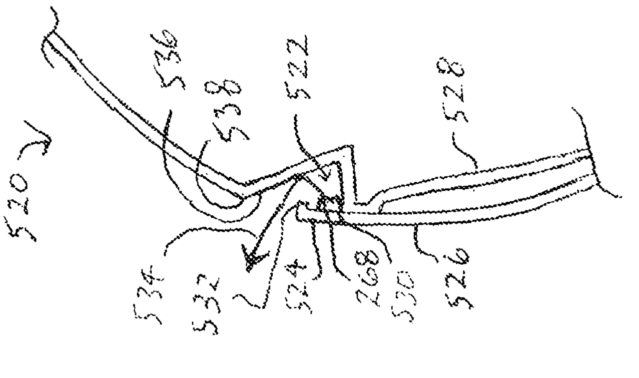

Although the above discussion and FIGS. 1-20 describe various embodiments and features of lighting systems for outboard motors and their implementation in regard to marine vessels and marine vessel assemblies, it should be appreciated that the present invention encompasses not only the above-described embodiments and features but also encompasses numerous variations of these embodiments and features and numerous other embodiments and features as well. Referring to FIGS. 21, 22, and 23, for example, it should be appreciated that the features of cowling panel sections and the arrangement of cowling panel sections relative to lighting sources can vary considerably from those described above in regard to FIGS. 1-20. For example, with respect to FIG. 21, a cross-sectional, cutaway view is provided of a cowling 520 in accordance with an example alternate embodiment in which the lighting source strip 268 (or another lighting source such as any of those described above) is positioned within an interior region or channel 522 between a blocking portion 524 of an outer panel 526 of the cowling and an inner panel 528 of the cowling. In contrast to the arrangement shown in FIG. 7, the lighting source strip 268 in the embodiment of FIG. 21 is positioned on an inwardly-facing surface 530 of the blocking portion 524 itself (below an inwardly-directed lip 532 of the blocking portion) rather than on the inner panel 528.

Notwithstanding the arrangement of the lighting source strip 268 in FIG. 21, it should be appreciated that light emanating from the lighting source strip 268 as represented by an arrow 534 still proceeds to location(s) outside of the cowling (at which the light can be seen by observers, such as the observer represented by the eye 282 of FIG. 7) after being reflected off of an inwardly-slanted surface 536 of the inner panel 528, which is similar to the inwardly-slanted surface 217 discussed above with respect to FIG. 7. As shown, the inwardly-slanted surface 536 extends from an apex/junction 538 to a level below the lighting source strip 268, and at least some of the inwardly-slanted surface can be considered as constituting a light strip (reflector) that is similar to the light strip 204 discussed above. By virtue of this reflection of the light, the light passes around/avoids the blocking portion 524 and proceeds out and away from the cowling 520.

Also, for example with respect to FIG. 22, a cross-sectional, cutaway view is provided of a cowling 540 in accordance with another example alternate embodiment encompassed herein. This embodiment is similar to that of FIG. 7 in that the lighting source strip 268 (or another lighting source such as any of those described above) is positioned within an interior region or channel 542 between a blocking portion 544 of an outer panel portion 546 and an inner panel portion 548. In contrast to the arrangement of FIG. 7, however, in this embodiment the outer panel portion 546 and inner panel portion 548 are integrally formed as a single cowling panel 550 (rather than as two distinct panels), and the lighting source strip 268 is supported upon a bridge panel portion 552 extending between the outer and inner panel portions 546 and 548 (where the bridge panel portion is also part of the single cowling panel 550). In substantially the same manner as discussed with reference to FIGS. 7 and 21, light emanating from the lighting source strip 268 as represented by an arrow 554 still proceeds to location(s) outside of the cowling (at which the light can be seen by observers, such as the observer represented by the eye 282 of FIG. 7) after being reflected off of the inner panel portion 548 so as to pass around/avoid the blocking portion 544.

It should be appreciated that, similar to as shown in FIGS. 7 and 21, the inner panel portion 548 particularly includes an inwardly-slanted surface 556 extending between the bridge panel portion 552 and an apex/junction 558, above which the inner panel portion 548 proceeds upward in a generally inwardly direction (e.g., away from the blocking portion 544). At least a portion of the inwardly-slanted surface 556 can be considered to be a light strip (reflector) substantially similar to the light strip (reflector) 204 of FIG. 7. Due to the arrangement of the inwardly-slanted surface 556 and apex/junction 558 along the inner panel portion 548, and the blocking portion 544 including an inwardly-directed lip 560 thereof, a field of view 562 is established. The field of view 562 more particularly extends between an upwardly directed bound 564 determined substantially by the position of the apex/junction 558 and a downwardly-directed bound 566 determined substantially by the position of the blocking portion 544 and inwardly-directed lip 560 thereof and, in the present example, can be 110 degrees. For observers positioned outside of the cowling 540 within the field of view 562, light emitted from the lighting source strip 268 (and reflected off of the inwardly-slanted surface 562 is visible. For observers positioned in any of regions 568 above (or inwardly of) the upwardly directed bound 564 or below (or inwardly of) the downwardly directed bound 566, light emitted from the lighting source strip 268 is not visible or not substantially visible.

Additionally, with respect to FIG. 23, a cross-sectional, cutaway view is provided of a cowling 570 in accordance with another example alternate embodiment encompassed herein. In this embodiment, similar to that of FIGS. 7 and 21, the cowling 570 again includes an outer panel 572 and an inner panel 574, and the lighting source strip 268 (or another lighting source such as any of those described above) is positioned within an interior region or channel 576 between a blocking portion 578 of the outer panel 572 and the inner panel 574 (albeit in this embodiment, the lighting source strip 268 rests upon an inwardly-extending ledge 580 of the outer panel 572 linking that panel with the inner panel 574, rather than on the inner panel itself). However, in contrast to FIGS. 7 and 21 (as well as FIG. 22), the inner panel 574 does not have any inwardly-slanted surface corresponding to the inwardly-slanted surfaces 217, 536, 556 of FIGS. 7, 21, and 22, respectively. Rather, as the inner panel 574 proceeds upward from the location at which it is contact with the inwardly-extending ledge 580, it maintains a significant distance from the blocking portion 578 and ultimately follows a path upward tending away and inwardly from the blocking portion.

Given this arrangement, light emitted from the lighting source strip 268 as represented by three arrows 582, 584, and 586 and emanating from the cowling 570 can take on a different appearance to observers positioned outward of the cowling 570 as represented by an eye 588, by comparison with the light emanating from the cowlings 200, 520, and 540 of FIGS. 7, 21, and 22. More particularly, although some light emitted from the lighting source strip 268 is reflected off of the inner panel 574 and then directed outwardly, as represented by the arrows 582 and 584, other light emitted from the lighting source strip 268 does not encounter or only grazes the inner panel 574 due to the shape of the inner panel and absence of any inwardly-slanted surface (or apex/junction bounding such a surface). Consequently, there is not the same type of bounded field of view in the embodiment of FIG. 23 as is the case with the field of view 562 shown in FIG. 22 (or at least there is no upper bound on the field of view in the embodiment of FIG. 23, even though there will still be a lower bound established by the blocking portion 578). Consequently, during operation of the lighting system in accordance with the embodiment of FIG. 23, an observer will not see a sharply-defined edge below which there is light and above which there is no (or substantially no) light emanating from the cowling, but rather will see light emanating from most or all of the cowling at locations above or substantially above the blocking portion 578, with the intensity of the light emanating from the cowling becoming progressively less as the observer shifts his or her vision progressively upward away from the blocking portion.

Figure 26:
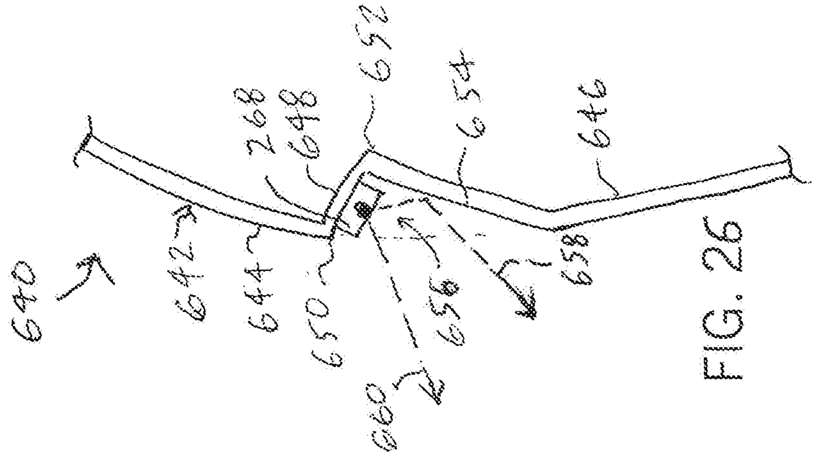
Figure 25:
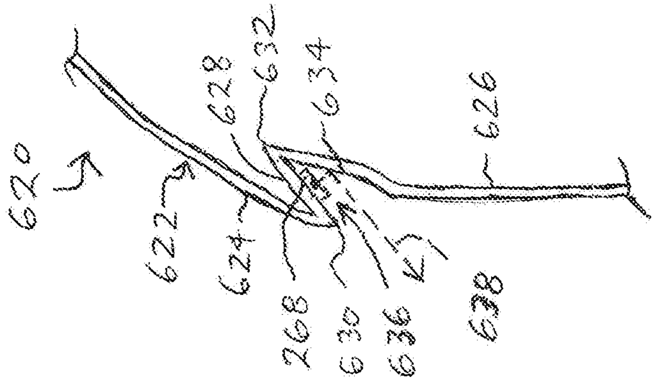
Figure 24:
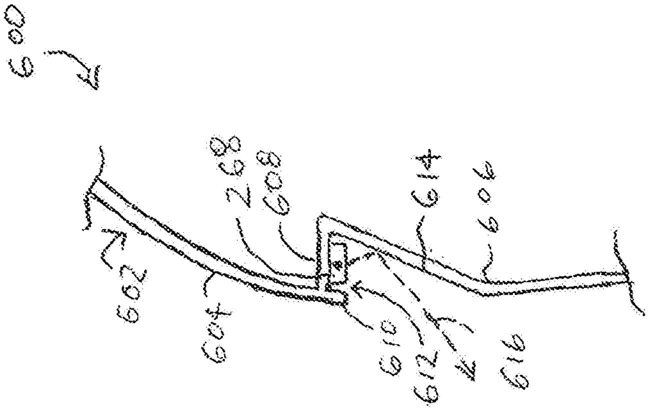

Turning additionally to FIGS. 24, 25 and 26, although the cowling arrangements shown in FIGS. 7, 21, 22, and 23 all show the lighting source strips 268 of those embodiments as being positioned within respective interior regions configured so that light emitted from the lighting source strips proceeds generally upward and then outward away from the cowlings (e.g., by direct transmission and/or reflection upward and outward out of the interior regions), in other embodiments this need not be the case. To the contrary, it is also possible to configure cowlings so as to have interior regions or recesses in relation to which lighting source strips (or other lighting sources) can be positioned so as to direct light generally downward and then outward away from the cowlings. For example, particularly with respect to FIG. 24, a cross-sectional, cutaway view is provided of a cowling 600 in accordance with another example alternate embodiment encompassed herein. Similar to the embodiment of FIG. 22, in the embodiment of FIG. 24 the cowling 600 has a single panel 602 that includes an outer panel portion 604, an inner panel portion 606, and a bridge panel portion 608 linking the outer panel and inner panel portions. The outer panel portion 604 also includes an extension that serves as a blocking portion 610, such that an interior region 612 is formed between that blocking portion, the bridge panel portion 608, and the inner panel portion 606. The lighting source strip 268 (or another lighting source such as any of those described above) is mounted on the bridge panel portion 608 within the interior region 612.

In contrast to the embodiment of FIG. 22, however, the corresponding portions of the cowling 600 are relatively inverted. That is, the inner panel portion 606 extends downwardly from the bridge panel portion 608 (rather than upwardly), the blocking portion 610 also extends downwardly from the bridge panel portion 608 with the remainder of the outer panel portion 604 extending upwardly from the bridge panel portion, the lighting source strip 268 is positioned so as to hang down from the bridge panel portion 608, and the interior region 612 generally opens downwardly. With such an arrangement, the lighting source strip 268 is still shielded from the external environment, including from sunlight and associated ultraviolet (UV) radiation and (to some extent) water and debris/material. However, light emitted from the lighting source strip 268, rather than proceeding upwardly, instead proceeds downwardly toward an inwardly-slanted surface 614 of the inner panel portion 606 and then is reflected downwardly and outwardly from the cowling 600 as represented by an arrow 616.

Additionally, with respect to FIG. 25, a cross-sectional, cutaway view is provided of a cowling 620 in accordance with another example alternate embodiment encompassed herein. In this embodiment, again the cowling 620 includes a single panel 622 with both an outer panel portion 624 and an inner panel portion 626 connected by way of a bridge panel portion 628. However, in this embodiment, rather than having any distinct blocking portion that extends beyond and independently past the bridge panel portion 628, instead the bridge panel portion 628 extends in an angled (non-horizontal) manner inwardly and upwardly from a bottom tip 630 of the outer panel portion 624 to an upper tip 632 of the inner panel portion 626. Further, an inwardly slanted surface 634 of the inner panel portion 626 proceeds generally downwardly and outwardly from that upper tip 632, and the lighting source strip 268 (or another lighting source such as any of those described above) is positioned within an interior region 636 formed by the combination of the bridge panel portion 628 and the inwardly slanted surface 634, which form an acute angle relative to one another.

With such an embodiment, the lighting source strip 268 again (as with the embodiment of FIG. 24) is still shielded from the external environment, including from sunlight and associated ultraviolet (UV) radiation and (to some extent) water and debris/material, due to being positioned within the interior region 636. Additionally with this arrangement, light emitted from the lighting source strip 268 (again as with the embodiment of FIG. 24) proceeds downwardly toward the inwardly-slanted surface 634 of the inner panel portion 626 and then is reflected downwardly and outwardly from the cowling 600 as represented by an arrow 638. In contrast with the embodiment of FIG. 24, however, no distinct blocking portion (or inwardly-directed lip thereof) is present in the arrangement of FIG. 25.

Further, with respect to FIG. 26, a cross-sectional, cutaway view is provided of a cowling 640 in accordance with another example alternate embodiment encompassed herein. As with the embodiment of FIG. 25, in this embodiment again the cowling 640 includes a single panel 642 with both an outer panel portion 644 and an inner panel portion 646 connected by way of a bridge panel portion 648. Also in this embodiment, the bridge panel portion 648 extends in an angled (non-horizontal) manner inwardly from a bottom tip 650 of the outer panel portion 644 to an upper tip 652 of the inner panel portion 646. Further, an inwardly slanted surface 654 of the inner panel portion 646 proceeds generally downwardly and outwardly from that upper tip 652, and the lighting source strip 268 (or another lighting source such as any of those described above) is positioned within an interior region 656 formed by the combination of the bridge panel portion 648 and the inwardly slanted surface 654.

Although similar in a number of respects to the embodiment of FIG. 25, the embodiment of FIG. 26 also differs from that of FIG. 25 in several respects. In particular, the bridge panel portion 648, rather than extending inwardly and upwardly from a bottom tip of the outer panel portion to an upper tip of the inner panel portion, instead extends inwardly and downwardly from the bottom tip 650 to the upper tip 652. Correspondingly, the bridge panel portion 648 and the inwardly slanted surface 654 form an obtuse angle relative to one another. With such an embodiment, the lighting source strip 268 again (as with the embodiment of FIGS. 24 and 25) is still shielded from the external environment, including from sunlight and associated ultraviolet (UV) radiation and (to some extent) water and debris/material, due to being positioned within the interior region 656. However, by comparison with the embodiments of FIGS. 24 and 25, the shielding is somewhat less both in relation to sunlight and associated UV radiation, as well as with respect to water and debris/material, since the interior region 656 is not enclosed to as great of an extent as the interior regions 612 and 636. Additionally with this arrangement of FIG. 26, although some light emitted from the lighting source strip 268 (again as with the embodiments of FIGS. 24 and 25) proceeds downwardly toward the inwardly-slanted surface 654 of the inner panel portion 646 and then is reflected downwardly and outwardly from the cowling 600 as represented by an arrow 658, other light emitted from the lighting source strip 268 as represented by an arrow 660 can proceed to exterior locations without any reflection whatsoever.

Thus, although the above discussion especially focuses largely upon embodiments in which light output from the outboard motor is indirectly output, after being reflected off of reflective devices (such as the light strips 204, 232, 234, 236), rather than being directly output from the light sources, the present disclosure is also intended to encompass other embodiments in which some or all light output from light sources is directly output to the outside environment around the outboard motor or cowling, without being reflected. Indeed, although the present disclosure encompasses embodiments in which light from light sources is reflected off of light strips or reflectors (again, such as the light strips 204, 232, 234, 236), the present disclosure is also intended to encompass embodiments in which regions along the cowling corresponding in position to the light strips or reflectors described herein (or at other locations) are in actuality transparent (or fully clear or see through) or translucent panel regions or windows. In such embodiments, light sources of any of the types described above (or other types of light sources) can be provided within the interior of the outboard motor, behind (e.g., inwardly of) the cowling and the transparent/translucent panel regions or windows. When the light sources are actuated, light proceeds from the light sources, out through the transparent/translucent panel regions or windows, and outward to exterior locations outside of the cowling/outboard motor.

Further, the present disclosure is also intended to encompass numerous embodiments in which other forms of lighting sources or lighting systems are employed. For example, in some alternate embodiments, instead of employing one or more of the lighting source strips each having multiple light sources arranged along the length of the respective strip (such as the lighting source strips 268 and 312 described above), rather one or more electroluminescent strips are employed as the lighting sources. Such electroluminescent strips can each operate to emit light from along the length of the respective strip in a continuous or substantially continuous manner.

Additionally, as already noted above, in at least some alternate embodiments the lighting systems employed on the outboard motors can employ light pipes with light sources arranged at end(s) of the light pipes (and formations along the light pipes along the lengths of the light pipes allowing light to escape from the light pipes) rather than employing lighting source strips such as the lighting source strip 268 having multiple light sources arranged along the length of the lighting source strip (and including one or more light sources arranged between the ends of the lighting source strip). Depending upon the embodiment, such arrangements can be implemented on any of the sides or surfaces of the outboard motors at which lighting is to be provided (e.g., along the right side, left side, and rear side of the as in the case of the cowling 200). In any of these embodiments involving any of these forms of lighting sources or lighting systems, depending upon the embodiment or implementation, the lighting sources or lighting systems (e.g., any of the lighting source strips, light pipes, electroluminescent strips, etc.) can be rigid or flexible. When flexible, a given lighting source can be made to conform to the shape of the cowling on which it is implemented (e.g., to the shape of the inner panel 248). Also, in at least some embodiments, the lighting sources or lighting systems are waterproof.

Figure 27:
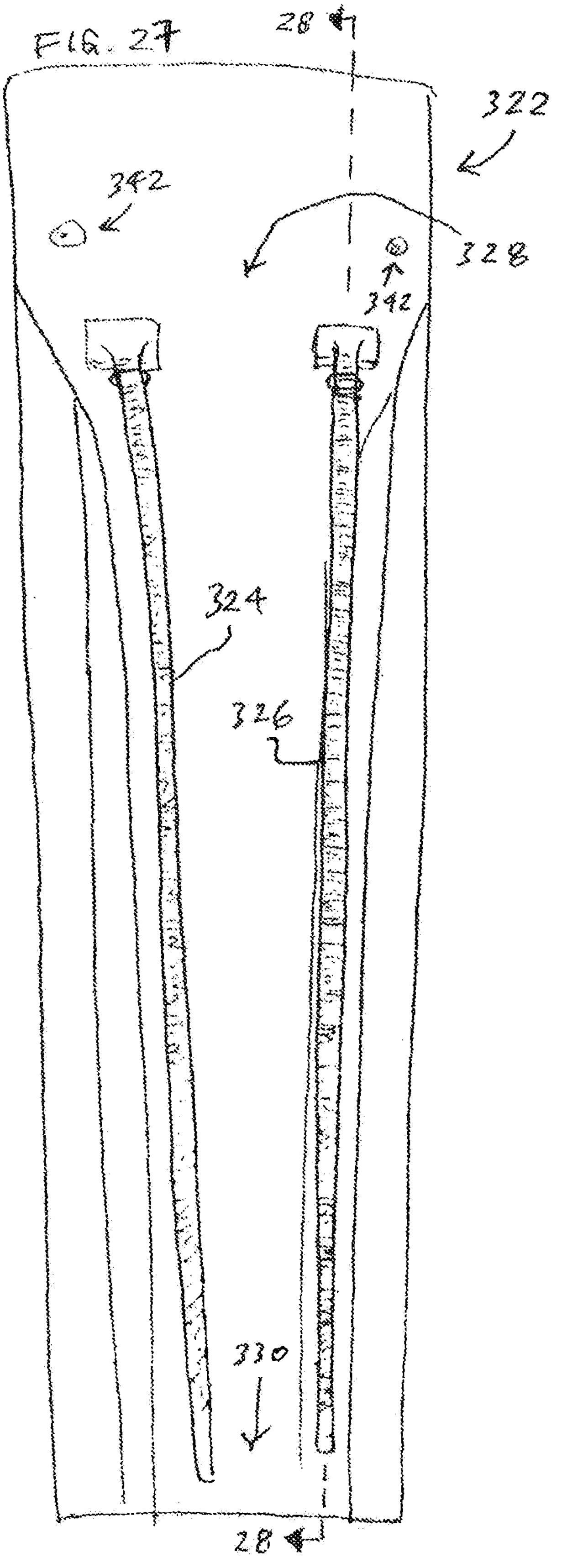
FIG. 27 is a rear elevation view of an alternate embodiment of a central section assembly differing from the central section assembly of FIG. 12.

Further in this regard, FIG. 27 provides a rear elevation view of an alternate embodiment of a central section assembly 322 that can be employed along the rear side of a cowling, for example, in place of the central section assembly 300 of the cowling 200 as described above. In contrast to the central section assembly 300, the central section assembly 322 employs first and second light pipes 324 and 326, respectively, that extend from an upper region 328 of the central section assembly 300 to a lower region 330 of the central section assembly. Thus, central section assembly 322 employs the light pipes 324, 326 in place of the lighting source strip 312.

Figure 28:
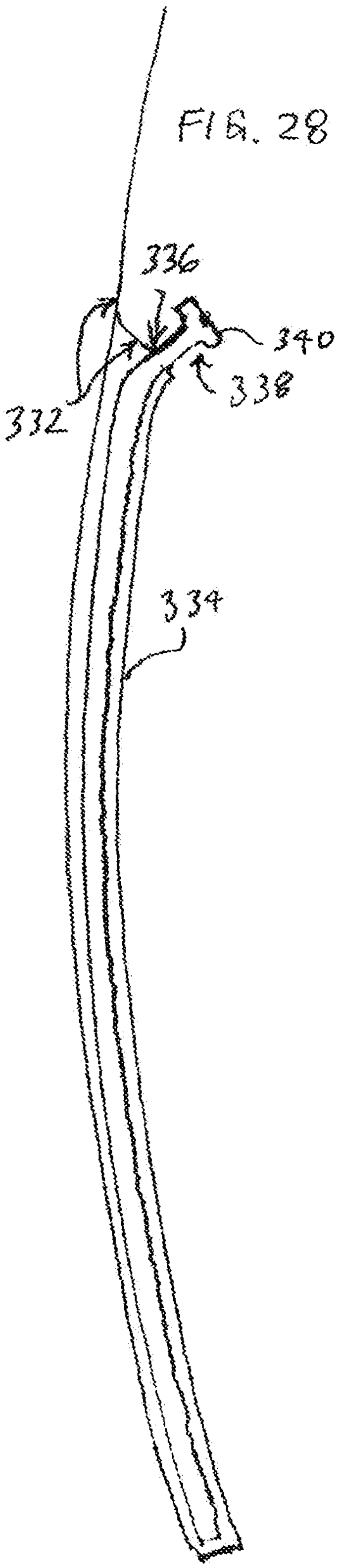
FIG. 28 is a cross-sectional view of the central section assembly of FIG. 27, taken along line 28-28 of FIG. 27.

Additionally as shown in a cross-sectional view of the central section assembly 322 taken along line 28-28 of FIG. 27, each of the light pipes 324, 326 (in this cross-section, the light pipe 326 is particularly shown) not only extends between the upper region 328 and the lower region 330 but also, at the upper region 328, extends through the central section assembly 322 from an outer surface 332 thereof inside past an inner surface 334 thereof, via a respective opening or orifice 336 (FIG. 28 particularly shows the orifice 336 for the light pipe 326, albeit it will be understood that a corresponding orifice is also provided for the light pipe 324). Further, at a respective upper end 338 of each of the light pipes 324, 326, a light source 340 is provided. Again, although the light source for the light pipe 326 is shown in FIG. 28, it should be appreciated that a corresponding light source for the light pipe 324 is also provided at the upper end of the light pipe 324. Also, it should be appreciated that the light sources 340 can take any of a variety of forms including any of those discussed above (e.g., light emitting diodes, light bulbs, etc.).

In the alternate embodiment of FIGS. 27 and 28, it should be appreciated that no structure corresponding to the exterior portion 304 of the central section assembly 300 is provided. Thus, in this embodiment, the light pipes 324, 326 (except for the upper ends 338 and light sources 340 at those upper ends) are directly exposed to the external environment, and light emitted from the light pipes 324, 326 is directly emitted away from the outboard motor without any reflection being provided by way of any light strips or other reflectors or otherwise. In such embodiment, the light pipes 324, 326 are accessible for service cleaning, and the light sources 340 are hidden and protected within the cowling and protected from exposure to outside environmental influences (such as ultraviolet radiation). Also, the light pipes 324, 326 can be withdrawn (or moved) through the orifices 336 (e.g., the light pipe 326 can be retracted into an interior region within the cowling, in which the light source 340 is already shown to be positioned, via the orifice 336).

Thus, the present disclosure is intended to encompass embodiments of outboard motors and cowlings thereof in which light is output directly from light sources or from light pipes (where the light pipes can themselves be considered light sources, notwithstanding that the light pipes are serving as conduits of light from actual light sources and that the light pipes themselves have reflective or refractive formations or facets along their lengths), without reflection by any reflectors or reflective components, and particularly without reflection by any reflectors or reflective components such as the light strips 204, 232, 234, 236 formed on exterior surface(s) of a cowling. Nevertheless, it should also be appreciated that the present disclosure also is intended to encompass embodiments employing light pipes in which light output from the light pipes is again precluded from being directly emitted away from the outboard motor or cowling, and in which the light output again reaches the external environment after being reflected off of reflectors or reflective components such as the light strips 204, 232, 232, and 236.

Thus, notwithstanding the above description concerning FIGS. 27 and 28, it should be understood that, in a further alternate embodiment, a structure identical or similar to that the central section assembly 322 shown in FIGS. 27 and 28 can instead be operated in combination with the exterior portion 304 discussed above (or in combination with another covering structure). Upon the exterior portion 304 being affixed to a structure with light pipes identical or similar to the central section assembly 322 of FIGS. 27 and 28 (e.g., by way of fastening mechanisms such as the fastening mechanisms 252 discussed above, it being appreciated that formations 342 shown in FIG. 27 can be considered to constitute two of the annular receiving structures 262), the exterior portion 304 would again serve to block light emitted from the light pipes. In such an embodiment, the light emitted from the light pipes would only reach the external environment after being additionally reflected by reflectors such as the light strips 232 and 234 discussed above in regard to FIG. 15.

Also for example, notwithstanding the particular arrangements of lighting source strips and light sources described above as being provided on the right side 202, left side 228, and rear side 226 of the cowling 200, in other embodiments such lighting source strips or light sources are provided on only one or some of those sides, or are provided on one or more other sides or surfaces of the cowling instead of or in addition to those sides, for example, along the top side 208 or front side 210 of the cowling. Also, the positioning of a given lighting source strip or light sources on a given side of the cowling can vary considerably from that shown.

Further, more than one lighting source strip and associated light sources, and/or more than one light strip (or reflector), and indeed any arbitrary number of lighting source strips and associated light sources, and/or any arbitrary number of light strips (or reflectors), can be provided on (or along, inside, or under) any given side or region or panel of the cowling or multiple sides, regions, or panels of the cowling. It is further possible in some embodiments that a light source strip (and associated light sources) can be positioned near (e.g., below, above, or to the side of) multiple light strips (or reflectors) that run parallel to one another or are all arranged in proximity to the light source strip (and associated light sources). With such an arrangement, the light emanating from the lighting source strip (and associated light sources) can be received at and reflected off of all of the different light strips (reflectors) in manners such that the light emitted away from the cowling/outboard motor is directed in multiple different directions respectively by the different light strips (reflectors) or such that the emitted light that is reflected off of the different respective light strips takes on different characteristics (e.g., different colors or intensities). Also, in some embodiments, the portions of the cowling off of which light is to be reflected need not be elongated strips such as the light strips (reflectors) 204, 232, 234, 236, but rather can take other shapes, such as circles, ovals, squares, or other regions.

Also, in some alternate embodiments, it is possible to arrange multiple lighting source strips (and associated light sources) in parallel relation to one another or otherwise close proximity to one another, within a shared internal region of the cowling. For example, in one such embodiment, two lighting source strips can be positioned side by side, parallel to one another, within an interior region such as the channel 272 described above. With such an arrangement the lighting source strips (and associated light sources) can be actuated independently and provide different types of light that, upon being reflected by a light strip (reflector) such as the light strip 204, result in light with a variety of characteristics being emitted away from the cowling/outboard motor after being reflected off of the same light strip. For example, in such an arrangement, light emitted by different respective lighting source strips (and associate light sources) can be, after reflection off the same light strip, directed in different respective directions away from the cowling/outboard motor. Or the light reflected from the light strip can take on different characteristics (e.g., in terms of color or intensity) depending upon which of the multiple lighting source strips (and associate light sources) generated the light.

Additionally, in at least some embodiments, it is possible for multiple lighting source strips (and associated light sources) to be implemented in a shared interior region such as the channel 272 in proximity to multiple light strips (or reflectors) that all are configured or positioned in relation to the lighting source strips (and associated light sources) so as to receive light from one or more of those lighting source strips (and associated light sources). Further, it should also be appreciated that, notwithstanding that the lighting source strips (and associated light sources) along the right side 202 (and left side 228) in the above-described embodiments are arranged partly below and substantially parallel to the light strip 204 so as to direct light upward toward the light strip, in other embodiments the lighting source strips can be arranged above a light strip and direct light downward, or be arranged in some other manner relative to a given light strip. In each such case, the lighting source strip (and light sources thereon) can still be arranged within a recessed or otherwise interior region protected from the outside environment by a blocking structure or wall serving a protective function similar to the blocking portion 278 as described above, with it being understood that the exact shape or features of such a structure or portion can vary considerably (e.g., in some embodiments, an inwardly-directed lip such as the inwardly-directed lip 288 need not be present).

Although in the present embodiment the lighting source strips (and associated light sources) are positioned on interior panels or structures and the protective structures or walls (e.g., the blocking portions 278) are formed on exterior panels or structures, in other embodiments other arrangements can be employed, such as arrangements in which the lighting source strips (and associated light sources) are positioned on exterior panels or structures. Further, depending upon the embodiment, the light strips (or reflectors) can be flat, curved, faceted, painted, or otherwise configured in a variety of manners that can result in different manners of light emission outward away from the cowling or outboard motor including, for example, the emission of light that is reflected or refracted in any of a variety of manners, light that is sharper or more diffuse, or light having any of a variety of colors, intensities, or other properties.

Further embodiments are also encompassed herein. For example, although the inner panel 248 and outer panel 250 in some embodiments are distinct, separate (or separable) panels, and although the interior portion 302 and exterior portion 304 also in some embodiments are distinct, separate (or separable) panels, in other embodiments the panels 248 and 250 can be integrally formed with one another and/or the portions 302 and 304 can be integrally formed with one another. Also, in some embodiments one or both of the panels 248, 250 can be integrally formed with one or more other structures, and/or one of both of the portions 302, 304 can be integrally formed with one or more other structures. Indeed, the present disclosure is intended to encompass any of a variety of embodiments in which multiple cowling structures are distinct or separate structures that can be separated or removable from one another as well as any of a variety of embodiments in which multiple different identifiable cowling structures, portions, or formations are integrally formed with one another or attached with one another in a permanent, fixed, substantially-fixed, or semi-permanent manner.

Relatedly, notwithstanding the above description of the vent cover 220, in alternate embodiments the vent cover need not be removable from the remainder of the cowling and, indeed, in some alternate embodiments the vent cover need not be an actual vent cover that serves any purpose of covering any vent, but rather can merely serve a decorative purpose as a cowling accent piece, a decorative or "fake" vent cover, or other cowl part. Also, it should be appreciated that, even though several of the formations or regions along the cowling 200 from which light is emitted for viewing (e.g., by observers) are elongated, continuous regions that are illuminable by reflecting light off of those formations or regions (e.g., the light strip 204, first light strip 232, second light strip 234, and third light strip 236), in other embodiments of cowlings encompassed herein the formations or regions that serve to emit light for viewing can take other forms than those described above. For example, in one alternate embodiment, any of the light strips 204, 232, 234, and 236 can be replaced with a series of distinct, separated light strip sections, so as to take the form of a dashed line or curve rather than a continuous line or curve.

Additionally, the present invention additionally encompasses methods of operating lighting systems on outboard motors, and methods of operating outboard motors and marine vessel assemblies employing such lighting systems, as well as methods of implementing such lighting systems, including methods of implementing such lighting systems in relation to outboard motors and in relation to marine vessel assemblies. In one example method of operating a lighting system encompassed herein, the method includes providing a set of light sources arranged within an interior region of a cowling, actuating the light sources to emit light toward a light strip, and reflecting the light at the light strip so that the light is emitted in a direction away from the cowling. Additionally, such a method can include blocking an additional portion of light emitted from the light sources by way of a blocking portion of a panel that at least partly defines the interior region. Further, in one example method of implementing a lighting system encompassed herein, the method includes attaching a lighting source strip including multiple light sources to a surface of an inner wall structure, providing a reflective surface on the inner wall structure or an additional structure that is exposed to an outside environment, and coupling a further wall structure to the inner wall structure so that an interior region is defined partly by the inner wall structure and the further wall structure.

It should be appreciated that one or more of the embodiments of lighting systems described herein are advantageous in one or more respects. First, the provision of lighting systems is advantageous because, by virtue of outputting light from one or more surfaces of an outboard motor associated with a marine vessel assembly, operators and others on board the marine vessel of that assembly can more effectively operate and enjoy use of the marine vessel assembly, especially in nighttime or poor-visibility conditions in which there is limited (or no) ambient light. Further, observers not present on the marine vessel assembly also can view the outboard motor and marine vessel assembly associated therewith. The overall lighting afforded by the lighting systems enhances visibility that can allow for more effective maneuvering of the marine vessel assembly in regard to other structures such as piers or other marine vessels, and is especially advantageous insofar as the outboard motors are typically mounted to extend outward beyond the perimeter of the marine vessels with which the outboard motors are associated.

Indeed, the light produced by way of the lighting systems described herein are desirable because the emission of increased light from one or more locations of the outboard motor can help both operators of the marine vessel assembly on which the lighting systems are provided as well as other third parties not positioned on board the marine vessel assembly to avoid collisions and otherwise enhance safety. This is true especially when the marine vessel assembly is being operated at nighttime or otherwise during conditions in which there is little ambient light. Notwithstanding the above use of the term "safety", it should at the same time be recognized that the present description of lighting systems and use thereof as provided herein does not constitute any guarantee or representation that these lighting systems or their use will render any particular operation of a marine vessel assembly, marine vessel, or outboard motor safe or that other systems will produce unsafe operation. Whether desired levels of safety can be achieved depends on a wide variety of factors outside of the scope of the present disclosure including, for example, other design considerations, proper installation and maintenance, whether such operation is occurring under the control of operators who are exercising care and/or performing control operations in a manner for which those operators have been trained, and other considerations.

In addition to the above advantages, one or more other advantages also can be provided by embodiments of the lighting systems described herein. For example, because the lighting source strips 268, 312 with the light sources 270 are located in interior regions such as the channel 272 that are shielded from the outside environment by portions of the outer panel 250 or exterior portion 304 such as the blocking portion 278 (or corresponding blocking portions of the exterior portion 304 along the edges 306, 308, and 310), the lighting source strips 268, 312 and light sources 270 are protected to a significant extent from direct exposure to ultraviolet (UV) radiation. This is advantageous because exposure to UV radiation generally can have an effect of reducing the length of life or degrading operation of lighting sources or optical components such as the lenses also associated with the lighting source strips 268, 312 (e.g., by causing discoloration of portions of such components). Further, this is particularly advantageous in the context of outboard motors, which are typically exposed to high levels of sunlight in often-bright environments.

Also, by virtue of blocking portions such as those associated with the outer panel 250 and exterior portion 304, the lighting source strips 268, 312 and light sources 270 are protected to a significant extent from exposure to other undesirable influences from the outside environment. For example, the lighting source strips 268, 312 and light sources 270 are also protected from experiencing the full brunt of the pressure of seawater that, due to wave action or otherwise, can be thrust against outboard motors. Also for example, the amount of debris, dirt, seaweed, algae, and other material that will collect on the lighting source strips 268, 312 and light sources 270 is limited due to the presence of those components within interior regions such as the channel 272, and related corrosion due to the presence of such materials along the lighting source strips and light sources is correspondingly limited. Thus, blocking portions such as those described above shield the lighting source strips or other light sources from each of sunlight/UV radiation, water, and debris/material of any of a variety of types.

Additionally, the provision of light from an outboard motor by way of lighting systems such as those described herein results in an outboard motor that is especially user-friendly not only in terms of the light that is provided, but also in terms of facilitating the servicing or maintenance of the outboard motor and the lighting system thereof. The detachability of the outer panels 250 and exterior portion 304 facilitates cleaning of the lighting source strips and light sources as well as replacement of light sources to the extent that one or more light sources cease to work after a period of time. Indeed, because the outer panels 250 and exterior portion 304 forming the blocking portions that protect the lighting source strips and light sources are removable, any such materials that do collect along the lighting source strips and light sources can be easily cleaned upon removal of the outer panels/exterior portion. Thus, the embodiments of lighting systems described herein are design in a manner that enhances cleanability and serviceability of the lighting systems.

Additionally, the hinged coupling of the upper portion and lower portion of the cowling with one another by way of the mechanical tether and associated electrical wiring allows for easy access to components within the outboard motor in a manner that is fully consistent with providing a lighting system in which light is emitted from the right and left sides of the cowling. Additionally, other embodiments that allow for electrical decoupling of the components on the upper and lower portions of the cowling (e.g., by virtue of electrical couplers as discussed above) also can facilitate servicing of the outboard motor. Further for example in this respect, as discussed above in regard to FIG. 20, connectors such as one or more of the connectors 518 can be employed to allow lighting system components such as the lighting source strips 268 positioned on the upper portion 238 of the cowling 200 to be disconnected from the lower portion 219 of the cowling (and thus from any lighting control system such as the lighting control system 510 operating to govern the lighting system) and thereby allow for easier access to engine components or other internal components of the outboard motor 104 (albeit in other embodiments the upper portion of the cowling can be opened relative to/removed from the lower portion of the cowling without any disconnections of lighting system components taking place).

Further, because the light emitted from outboard motors as described above is reflected light emanating from the light strips 204, 232, 234, 236 or from other light strips (reflectors) or other reflective components, the appearance of the light is different and distinct from the appearance of light directly emitted from light sources such as the light sources 270. Such reflected light in at least some embodiments can be particularly desirable from an aesthetic perspective. Also, depending upon the embodiment, the light that is reflected can take on, as already described below, any of a variety of characteristics that can be desirable for different circumstances of operation or for other reasons, including characteristics involving different colors, hues, intensities, directionally-based intensities (in terms of the direction of the path taken by the light emanating from the light strip or other reflective component), collimation or focal point, or other optical properties. Further, the light that is output can serve other purposes such as communicating one or more messages.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. In an outboard motor having a cowling and configured for attachment to and use with a marine vessel, a lighting system comprising:

a first cowling panel portion including a reflective strip portion;

a second cowling panel portion that, in combination with the first cowling panel portion, at least partly defines an interior region within the cowling; and a lighting source, wherein the lighting source is supported on one or more of the first cowling panel portion, the second panel portion, or a further panel portion, within the interior region, wherein the lighting source is positioned so that, when operating, first light is emitted toward the reflective strip portion, wherein the reflective strip portion is configured so that, upon the first light reaching the reflective strip portion, at least some of the first light is directed outward away from the cowling;

and wherein the first cowling panel portion and the second cowling panel portion are integrally formed.

2. An outboard motor configured for attachment to and use with a marine vessel, the outboard motor comprising:

an upper portion at which is positioned an internal combustion engine that provides rotational power output via a crankshaft, a lower portion at which is positioned a gearcase supporting a propeller shaft and propeller;

a mid portion at which is positioned at least one transmission component that allows for transmission of at least some of the rotational power output to the gearcase; and a cowling that extends around at least a portion of the outboard motor so as to form a housing therefore, the cowling including a plurality of light sources supported within interior regions formed within the cowling, wherein the cowling additionally includes at least one reflective portion, wherein the light sources are arranged to emit light toward the at least one reflective portion, and the at least one reflective portion is configured so that, upon receiving the light, at least some of the light is directed outward away from cowling.

3. The outboard motor of claim 2, wherein the at least one reflective portion includes a first reflective portion arranged along a starboard or port side of the cowling, and a second reflective portion arranged along a rear side of the cowling.

4. The outboard motor of claim 2, wherein the at least one reflective portion includes a plurality of reflective strip portions arranged along a rear side of the cowling, wherein the plurality of reflective strip portions are arranged so as to be substantially parallel to a plurality of segments of a substantially inverted U shaped lighting source strip along which the plurality of light sources are distributed.

5. The outboard motor of claim 2, wherein the at least one reflective portion includes a reflective strip that is provided on an inwardly-slanted section of a first panel portion of the cowling, wherein the inwardly-slanted section extends from a location at which the inwardly slanted section is directly facing an external environment to a second location at which the inwardly slanted section is positioned inwardly of a second panel portion of the cowling that is directly facing the external environment, and wherein the light sources are arranged within an interior region formed between the first and second panel portions.

6. In an outboard motor having a cowling and configured for attachment to and use with a marine vessel, a lighting system comprising:

a first cowling panel portion configured to at least partly surround an internal region in which are positioned one or more internal components of the outboard motor, and having a first surface that is substantially outwardly facing away the internal region;

a light pipe having a first end and a second end, the light pipe extending along the first surface and through an orifice in the first cowling panel portion such that a first portion of the light pipe is positioned along the first surface outside of the internal region and a second portion of the light pipe including the first end is within the internal region;

a light source arranged at the first end, within the internal region, wherein the light source is substantially shielded from ultraviolet radiation existing externally of the outboard motor and wherein the orifice and light pipe are configured so that the light pipe can be withdrawn via the orifice.

7. The lighting system of claim 6, wherein the first cowling panel portion additionally has a second surface that is substantially inwardly facing toward the internal region, and wherein the light pipe includes a plurality of formations along a length of the light pipe such that, upon light proceeding through the light pipe from the light source, at least some of the light is emitted from the light pipe after being reflected or refracted via the formations.

8. The lighting system of claim 7, further comprising a second cowling panel portion that is fastened to the first cowling panel portion so that the first portion of the light pipe is positioned between the first and second cowling panel portions, and wherein at least a first amount of the light emitted from the light pipe is blocked from reaching the external environment by the second cowling panel portion.

9. The lighting system of claim 8, wherein a reflective component is provided along the first cowling panel portion, wherein at least a second amount of the light emitted from the light pipe reaches the external environment after being reflected off of the reflective component.

* * * * *